(12) United States Patent
Taherzadeh Boroujeni et al.

(10) Patent No.: US 11,729,603 B2
(45) Date of Patent: Aug. 15, 2023

(54) TECHNIQUES FOR REPORTING UPLINK TRANSMISSION CONTINUITY CAPABILITY

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/221,478

(22) Filed: Apr. 2, 2021

(65) Prior Publication Data

US 2022/0322074 A1   Oct. 6, 2022

(51) Int. Cl.
*H04W 56/00* (2009.01)
*H04W 8/24* (2009.01)
*H04W 72/0446* (2023.01)
*H04W 72/0453* (2023.01)
*H04W 72/1273* (2023.01)
*H04W 72/50* (2023.01)

(52) U.S. Cl.
CPC ......... *H04W 8/24* (2013.01); *H04W 72/0446* (2013.01); *H04W 72/0453* (2013.01); *H04W 72/1273* (2013.01); *H04W 72/535* (2023.01)

(58) Field of Classification Search
CPC ............... H04W 8/24; H04W 72/0446; H04W 72/0453; H04W 72/1257; H04W 72/1273
USPC ......................................................... 370/329
See application file for complete search history.

(56) References Cited

U.S. PATENT DOCUMENTS

| | | | |
|---|---|---|---|
| 2010/0103886 A1* | 4/2010 | Chun | H04L 1/0028 370/310 |
| 2020/0007294 A1* | 1/2020 | Yang | H04W 52/146 |
| 2021/0352596 A1* | 11/2021 | Liu | H04W 8/24 |

OTHER PUBLICATIONS

International Search Report and Written Opinion—PCT/US2022/070772—ISA/EPO—dated Jun. 8, 2022 (2103033WO).

(Continued)

*Primary Examiner* — Sai Ming Chan
(74) *Attorney, Agent, or Firm* — Holland & Hart LLP

(57) ABSTRACT

Methods, systems, and devices for wireless communications are described. A user equipment (UE) may transmit, to a base station, capability signaling indicating one or more phase coherency capabilities of the UE for maintaining phase coherence across multiple uplink messages within a time interval, wherein each phase coherency capability is based on one or more channel usage characteristics associated with the time interval. The UE may receive, from the base station, a downlink message scheduling a set of uplink messages from the UE to the base station within the time interval. The UE may transmit the set of uplink messages within the time interval based on the downlink message and in accordance with at least one of the one or more phase coherency capabilities.

30 Claims, 15 Drawing Sheets

(56) References Cited

OTHER PUBLICATIONS

Qualcomm Incorporated: "PUCCH Coverage Enhancements", 3GPP Draft, R1-2101480, 3GPP TSG-RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, no. e-Meeting, Jan. 25, 2021-Feb. 5, 2021, Jan. 19, 2021 (Jan. 19, 2021), XP051971645, 4 pages, Retrieved from the Internet: URL: https://ftp.3gpp.org/tsg_ran/WG1_RL1/TSGR1_104-e/Docs/R1-2101480.zip R1-2101480 PUCCH coverage enhancements.docx [retrieved on Jan. 19, 2021] section 3, p. 2-p. 3.

VIVO: "Discussion on PUCCH Enhancements", 3GPP Draft, 3GPP TSG RAN WG1 #104-e, R1-2100460, 3rd Generation Partnership Project (3GPP), Mobile Competence Centre, 650, Route Des Lucioles, F-06921 Sophia-Antipolis Cedex, France, vol. RAN WG1, no. e-Meeting, Jan. 25, 2021-Feb. 5, 2021, Jan. 18, 2021 (Jan. 18, 2021), XP051970382, 6 Pages, Retrieved from the Internet: URL: https://ftp.3gpp.org/tsg_ran/WG1_RL1/TSGR1_104-e/Docs/R1-2100460.zip R1-2100460.docx [retrieved on Jan. 18, 2021] the whole document, section 3.1, p. 2.

\* cited by examiner

TECHNIQUES FOR REPORTING UPLINK TRANSMISSION CONTINUITY CAPABILITY

FIELD OF TECHNOLOGY

The following relates to wireless communications, including techniques for reporting uplink transmission continuity capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may perform channel estimation of a wireless channel between the base station and a UE based on uplink messages (e.g., reference signals) received from the UE. In some cases, a UE may transmit phase-coherent uplink messages (e.g., uplink messages transmitted with a common phase) to facilitate channel estimation at the base station. As such, the base station may schedule a UE to transmit phase-coherent uplink messages in order to improve channel estimation between the base station and the UE. However, different UEs may exhibit differing capabilities for maintaining phase coherency across uplink messages.

SUMMARY

The described techniques relate to improved methods, systems, devices, and apparatuses that support techniques for reporting uplink transmission continuity capability. Generally, aspects of the present disclosure are directed to techniques which enable user equipments (UEs) to signal various capabilities for maintaining phase coherency across uplink messages. In particular, aspects of the present disclosure introduce capability signaling which enables a UE to indicate whether it supports various phase coherency capabilities. For example, a UE may transmit capability signaling which indicates it supports one or more phase coherency capabilities for maintaining phase coherency across multiple uplink messages. In some cases, phase coherency capabilities may be pre-defined, and indicated via capability index values. The base station may then transmit a grant which schedules the UE to perform uplink messages based on the phase coherency capabilities, and the UE may transmit phase-coherent uplink messages in accordance with the grant and indicated phase coherency capabilities.

A method for wireless communication at a UE is described. The method may include transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, receiving, from the base station, a downlink message scheduling a set of multiple uplink messages from the UE to the base station within the time interval, and transmitting the set of multiple uplink messages within the time interval based on the downlink message and in accordance with at least one of the one or more phase coherency capabilities.

An apparatus for wireless communication at a UE is described. The apparatus may include a processor, memory coupled with the processor, and instructions stored in the memory. The instructions may be executable by the processor to cause the apparatus to transmit, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, receive, from the base station, a downlink message scheduling a set of multiple uplink messages from the UE to the base station within the time interval, and transmit the set of multiple uplink messages within the time interval based on the downlink message and in accordance with at least one of the one or more phase coherency capabilities.

Another apparatus for wireless communication at a UE is described. The apparatus may include means for transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, means for receiving, from the base station, a downlink message scheduling a set of multiple uplink messages from the UE to the base station within the time interval, and means for transmitting the set of multiple uplink messages within the time interval based on the downlink message and in accordance with at least one of the one or more phase coherency capabilities.

A non-transitory computer-readable medium storing code for wireless communication at a UE is described. The code may include instructions executable by a processor to transmit, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, receive, from the base station, a downlink message scheduling a set of multiple uplink messages from the UE to the base station within the time interval, and transmit the set of multiple uplink messages within the time interval based on the downlink message and in accordance with at least one of the one or more phase coherency capabilities.

In some examples of the method, apparatuses, and non-transitory computer-readable medium described herein, transmitting the capability signaling may include operations, features, means, or instructions for transmitting the capability signaling indicating one or more capability index values associated with the one or more phase coherency capabilities.

Some examples of the method, apparatuses, and non-transitory computer-readable medium described herein may further include operations, features, means, or instructions for receiving, from the base station, control signaling indicating a set of multiple capability index values associated with a set of multiple phase coherency capabilities, where the set of multiple capability index values include the one or more capability index values, where the set of multiple phase coherency capabilities include the one or more phase coherency capabilities, and where transmitting the one or more capability index values may be based on receiving the control signaling.

In some examples of the method, apparatuses, and non-transitory computer-readable medium described herein, the capability signaling indicates one or more parameters of the one or more channel usage characteristics associated with the time interval.

In some examples of the method, apparatuses, and non-transitory computer-readable medium described herein, the one or more parameters of the one or more channel usage characteristics include a time threshold associated with a gap between consecutive uplink messages of the set of multiple uplink messages, a downlink activity associated with the gap between consecutive uplink messages of the set of multiple uplink messages of the time interval, an uplink activity associated with the gap between consecutive uplink messages of the set of multiple uplink messages of the time interval, a maximum duration of the time interval, a phase coherency threshold, or any combination thereof.

In some examples of the method, apparatuses, and non-transitory computer-readable medium described herein, the time interval includes a first transmission time interval (TTI) and a second TTI, and phase coherence may be maintained across uplink messages of the set of multiple uplink messages if a phase difference between phases of the respective uplink messages may be less than or equal to a phase threshold.

In some examples of the method, apparatuses, and non-transitory computer-readable medium described herein, a first phase coherency capability of the set of multiple phase coherency capabilities may include operations, features, means, or instructions for maintaining phase coherence across uplink messages of the set of multiple uplink messages within the first TTI and the second TTI based on a gap between the first TTI and the second TTI satisfying a time threshold.

In some examples of the method, apparatuses, and non-transitory computer-readable medium described herein, the gap satisfies the time threshold if the gap may be less than or equal to the time threshold.

In some examples of the method, apparatuses, and non-transitory computer-readable medium described herein, a second phase coherency capability of the set of multiple phase coherency capabilities may include operations, features, means, or instructions for maintaining phase coherence across uplink messages of the set of multiple uplink messages within the first TTI and the second TTI based on the first TTI and the second TTI including consecutive TTIs.

In some examples of the method, apparatuses, and non-transitory computer-readable medium described herein, a third phase coherency capability of the set of multiple phase coherency capabilities may include operations, features, means, or instructions for maintaining phase coherence across uplink messages of the set of multiple uplink messages within the first TTI and the second TTI based on an absence of additional uplink communications scheduled within the gap, an absence of downlink communications scheduled within the gap, or both.

In some examples of the method, apparatuses, and non-transitory computer-readable medium described herein, a fourth phase coherency capability of the set of multiple phase coherency capabilities may include operations, features, means, or instructions for maintaining phase coherence across uplink messages of the set of multiple uplink messages within the first TTI and the second TTI based on a type of additional uplink communications scheduled within the gap, a type of additional downlink communications scheduled within the gap, or both.

Some examples of the method, apparatuses, and non-transitory computer-readable medium described herein may further include operations, features, means, or instructions for transmitting or receiving a message within a third TTI of the time interval, the third TTI positioned between the first TTI and the second TTI in a time domain, where a fifth phase coherency capability of the set of multiple phase coherency capabilities maintaining phase coherence across uplink messages of the set of multiple uplink messages within the first TTI and the second TTI based on a gap between the third TTI and the second TTI satisfying a time threshold.

In some examples of the method, apparatuses, and non-transitory computer-readable medium described herein, a sixth phase coherency capability of the set of multiple phase coherency capabilities may include operations, features, means, or instructions for maintaining phase coherence across uplink messages of the set of multiple uplink messages within the first TTI and the second TTI based on the time interval being less than or equal to a maximum time interval threshold.

Some examples of the method, apparatuses, and non-transitory computer-readable medium described herein may further include operations, features, means, or instructions for transmitting, to the base station, additional capability signaling indicating one or more modifications to the one or more phase coherency capabilities, receiving, from the base station, a second downlink message scheduling a second set of multiple uplink messages from the UE to the base station, and transmitting the second set of multiple uplink messages based on the second downlink message and in accordance with at least one of the one or more modified phase coherency capabilities.

A method for wireless communication at a base station is described. The method may include receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, transmitting, to the UE, a downlink message scheduling a set of multiple uplink messages from the UE to the base station within the time interval, and receiving the set of multiple uplink messages within the time interval based on the downlink message and in accordance with at least one of the one or more phase coherency capabilities.

An apparatus for wireless communication at a base station is described. The apparatus may include a processor, memory coupled with the processor, and instructions stored in the memory. The instructions may be executable by the processor to cause the apparatus to receive, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, transmit, to the UE, a downlink message scheduling a set of multiple uplink messages from the UE to the base station within the time interval, and receive the set of multiple uplink messages within the time interval based on the downlink message and in accordance with at least one of the one or more phase coherency capabilities.

Another apparatus for wireless communication at a base station is described. The apparatus may include means for receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, means for transmitting, to the UE, a downlink message scheduling a set of multiple uplink messages from the UE to the base station within the time interval, and means for receiving the set of multiple uplink messages within the time interval based on the downlink message and in accordance with at least one of the one or more phase coherency capabilities.

A non-transitory computer-readable medium storing code for wireless communication at a base station is described. The code may include instructions executable by a processor to receive, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval, transmit, to the UE, a downlink message scheduling a set of multiple uplink messages from the UE to the base station within the time interval, and receive the set of multiple uplink messages within the time interval based on the downlink message and in accordance with at least one of the one or more phase coherency capabilities.

Some examples of the method, apparatuses, and non-transitory computer-readable medium described herein may further include operations, features, means, or instructions for decoding the set of multiple uplink messages based on one or more coherency assumptions associated with the set of multiple uplink messages, where the one or more coherency assumptions may be determined based on the one or more phase coherency capabilities.

Some examples of the method, apparatuses, and non-transitory computer-readable medium described herein may further include operations, features, means, or instructions for determining a channel estimate associated with a channel between the UE and the base station based on receiving the set of multiple uplink messages.

In some examples of the method, apparatuses, and non-transitory computer-readable medium described herein, receiving the capability signaling may include operations, features, means, or instructions for receiving the capability signaling indicating one or more capability index values associated with the one or more phase coherency capabilities.

Some examples of the method, apparatuses, and non-transitory computer-readable medium described herein may further include operations, features, means, or instructions for transmitting, to the UE, control signaling indicating a set of multiple capability index values associated with a set of multiple phase coherency capabilities, where the set of multiple capability index values include the one or more capability index values, where the set of multiple phase coherency capabilities include the one or more phase coherency capabilities, and where transmitting the one or more capability index values may be based on receiving the control signaling.

In some examples of the method, apparatuses, and non-transitory computer-readable medium described herein, the capability signaling indicates one or more parameters of the one or more channel usage characteristics associated with the time interval.

In some examples of the method, apparatuses, and non-transitory computer-readable medium described herein, the one or more parameters of the one or more channel usage characteristics include a time threshold associated with a gap between consecutive uplink messages of the set of multiple uplink messages, a downlink activity associated with the gap between consecutive uplink messages of the set of multiple uplink messages of the time interval, an uplink activity associated with the gap between consecutive uplink messages of the set of multiple uplink messages of the time interval, a maximum duration of the time interval, a phase coherency threshold, or any combination thereof.

DETAILED DESCRIPTION

Figure 1:
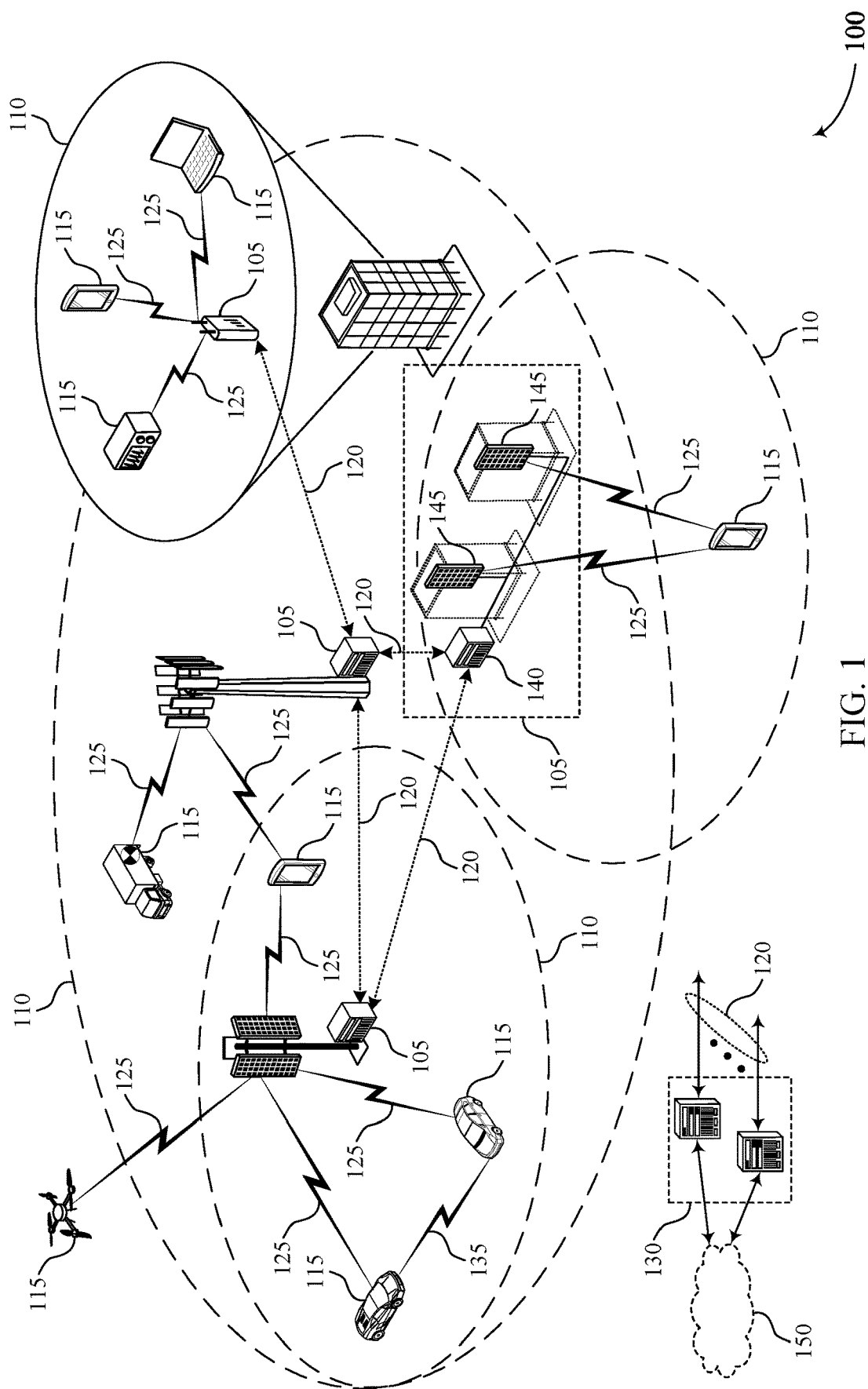
FIG. 1 illustrates an example of a wireless communications system that supports techniques for reporting uplink transmission continuity capability in accordance with aspects of the present disclosure.

A base station may perform channel estimation of a wireless channel between the base station and a user equipment (UE) based on uplink messages (e.g., sounding reference signals (SRSs), demodulation reference signals (DMRSs)) received from the UE. In some cases, a UE may transmit phase-coherent uplink messages (e.g., uplink messages transmitted with a common phase) to facilitate channel estimation (e.g., joint channel estimation) at the base station. As such, the base station may schedule a UE to transmit phase-coherent uplink messages in order to improve channel estimation between the base station and the UE.

However, different UEs may exhibit differing capabilities for maintaining phase coherency across uplink messages. Time gaps between uplink messages, a presence or type of communications scheduled between uplink messages, and other channel usage characteristics may affect the ability of UEs to maintain phase coherency across uplink messages. Some wireless communications systems do not provide signaling which enables UEs to indicate a capability to maintain phase coherence across multiple uplink messages depending on differing channel usage characteristics (e.g., time duration between uplink messages, other scheduled communications). Without knowing a capability of UEs to maintain phase coherency, the base station may be unable to efficiently schedule uplink messages used for channel estimation and may be unable to accurately determine the phase coherency assumptions to apply to a set of uplink messages.

Accordingly, aspects of the present disclosure are directed to techniques which enable UEs to signal various capabilities for maintaining phase coherency across uplink messages. In particular, aspects of the present disclosure introduce capability signaling which enables a UE to indicate whether it supports various phase coherency capabilities. For example, a UE may transmit capability signaling which indicates it supports one or more phase coherency capabilities for maintaining phase coherency across multiple uplink messages. The base station may transmit a grant which schedules the UE to perform uplink messages based on the phase coherency capabilities, and the UE may transmit phase-coherent uplink messages in accordance with the grant and indicated phase coherency capabilities. The base station may decode the uplink messages based on one or more phase coherency assumptions determined based on the capability signaling, and may perform channel estimation (e.g., joint channel estimation) based on the received uplink messages.

The phase coherency capabilities may be based on channel usage characteristics of a time interval across which uplink messages are to be transmitted (e.g., time gap between uplink messages, presence or type of other communications scheduled within the time interval). In some implementations, phase coherency capabilities may be pre-defined, dynamically indicated, or both. In cases where the phase coherency capabilities are pre-defined, the UE may indicate that it supports certain phase coherency capabilities by transmitting capability index values corresponding to the supported phase coherency capabilities. Conversely, the UE may dynamically indicate parameters for channel usage characteristics associated with supported phase coherency capabilities. For example, the UE may indicate that it may maintain phase coherency between uplink messages if a time duration between the uplink messages is less than some time threshold, or if no other communications are scheduled between the uplink messages.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for reporting uplink transmission continuity capability.

FIG. 1 illustrates an example of a wireless communications system 100 that supports techniques for reporting uplink transmission continuity capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency (RF) spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support techniques which enable UEs to signal various capabilities for maintaining phase coherency across uplink messages. In particular, the UEs 115 and the base stations 105 of the wireless communications system 100 may be configured to support capability signaling which enables a UE 115 to indicate whether it supports various phase coherency capabilities. For example, a UE 115 may transmit capability signaling which indicates it supports one or more phase coherency capabilities for maintaining phase coherency across multiple uplink messages. The base station 105 may transmit a grant which schedules the UE 115 to perform uplink messages based on the phase coherency capabilities, and the UE 115 may transmit phase-coherent uplink messages in accordance with the grant and indicated phase coherency capabilities. The base station 105 may decode the uplink messages based on one or more phase coherency assumptions determined based on the capability signaling, and may perform channel estimation based on the received uplink messages.

The phase coherency capabilities may be based on channel usage characteristics of a time interval across which uplink messages are to be transmitted (e.g., time gap between uplink messages, presence or type of other communications scheduled within the time interval). In some implementations, phase coherency capabilities may be pre-defined, dynamically indicated, or both. In cases where the phase coherency capabilities are pre-defined, the UE 115 may indicate that it supports certain phase coherency capabilities by transmitting capability index values corresponding to the supported phase coherency capabilities. Conversely, the UE 115 may dynamically indicate parameters for channel usage characteristics associated with supported phase coherency capabilities. For example, the UE 115 may indicate that it may maintain phase coherency between uplink messages if a time duration between the uplink messages is less than some time threshold, or if no other communications are scheduled between the uplink messages.

Techniques described herein may enable UEs 115 to report one or more supported phase coherency capabilities for maintaining phase coherence across multiple uplink messages. Enabling UEs 115 to report supported phase coherency capabilities may improve the ability of the base stations 105 of the wireless communications system 100 to schedule uplink messages at the UEs 115 in accordance with supported phase coherency capabilities at the respective UEs 115. As such, techniques described herein may improve phase coherency of uplink messages transmitted by the UEs 115, which may facilitate channel estimation at the base stations 105, thereby leading to more efficient and reliable wireless communications within the wireless communications system 100.

Figure 2:
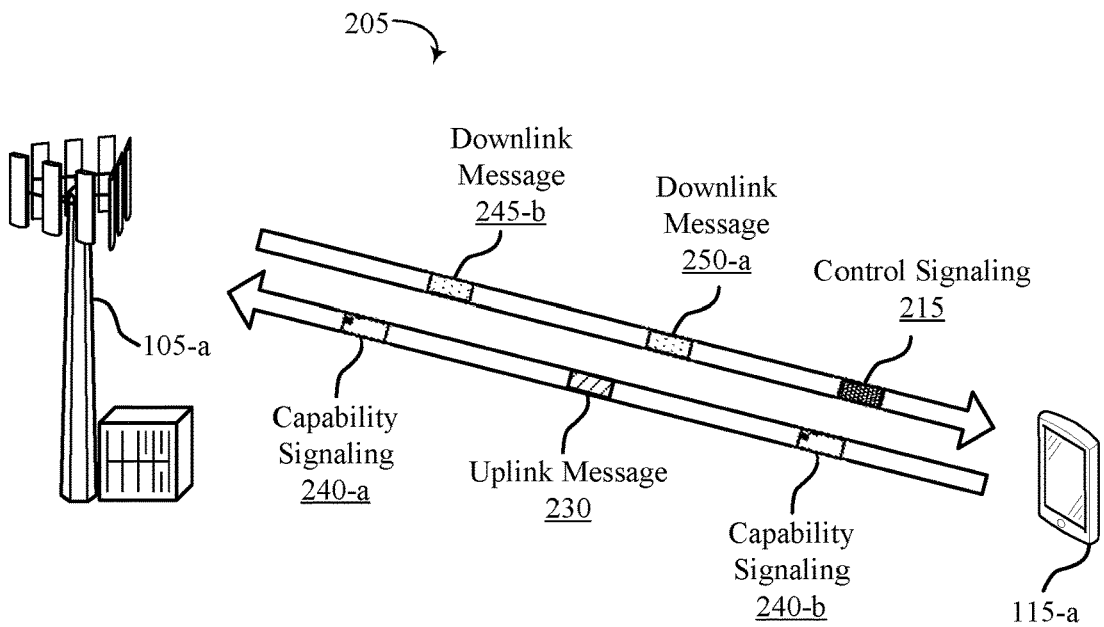
FIG. 2 illustrates an example of a wireless communications system that supports techniques for reporting uplink transmission continuity capability in accordance with aspects of the present disclosure.
Figure 2:
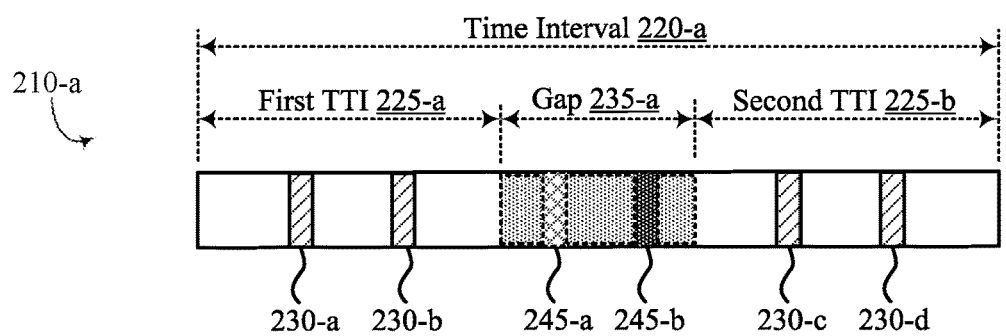
Figure 2:
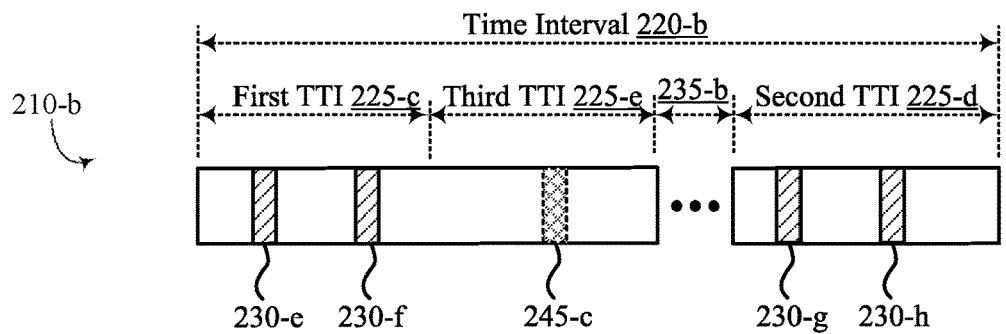

FIG. 2 illustrates an example of a wireless communications system 200 that supports techniques for reporting uplink transmission continuity capability in accordance with aspects of the present disclosure. In some examples, wireless communications system 200 may implement, or be implemented by, aspects of wireless communications system 100. For example, wireless communications system 200 may support capability signaling which enables UEs 115 to report supported phase coherency capabilities, as described with reference to FIG. 1.

The wireless communications system 200 may include a base station 105-a, and a UE 115-a, which may be examples base stations 105 and UEs 115 as described with reference to FIG. 1. The UE 115-a may communicate with the base station 105-a using a communication link 205, which may be an example of an NR or LTE link between the UE 115-a and the base station 105-a. In some cases, the communication link 205 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals, to the base station 105-a using the communication link 205 and the base station 105-*a* may transmit downlink signals, such as downlink control signals or downlink data signals, to the UE 115 using the communication link 205.

As noted previously herein, the base station 105-*a* may perform channel estimation of a wireless channel between the base station 105-*a* and the UE 115-*a* based on uplink messages (e.g., SRSs, DMRSs) received from the UE 115-*a*. In some cases, the UE 115-*a* may transmit phase-coherent uplink messages (e.g., uplink messages transmitted with a common or similar phase) to facilitate channel estimation at the base station 105-*a*. For the purposes of the present disclosure, the term "phase coherent," "phase coherency," "phase continuity," and like terms, may be used to refer to uplink messages which are transmitted such that a phase difference between the respective uplink messages is less than or equal to some phase threshold. In other words, two uplink messages may be considered to be "phase coherent" if they exhibit the same, or similar, phases (e.g., within a threshold).

As such, the base station 105-*a* may schedule the UE 115-*a* to transmit phase-coherent uplink messages in order to perform joint channel estimation (e.g., DMRS bundling). In particular, the UE 115-*a* may be configured to bundle DMRSs (e.g., phase-coherent DMRSs) across multiple transmissions over a corresponding set of time resources (e.g., time interval). In such cases, the bundled DMRSs from multiple transmissions over the time interval are jointly considered (e.g., coherently combined) at the base station 105-*a*, which may provide a more accurate estimation of the channel, or otherwise increase the accuracy of decoding transmissions than if the DMRSs of each transmission were considered separately.

However, different UEs 115 may exhibit differing capabilities for maintaining phase coherency across uplink messages. In other words, the ability of the UE 115-*a* to support DMRS bundling may depend on the capability of the UE 115-*a* to maintain phase continuity across bundled uplink messages (e.g., DMRSs). Time gaps between uplink messages, a presence or type of communications scheduled between uplink messages, and other channel usage characteristics may affect the ability of UEs 115 to maintain phase coherency across uplink messages. Some wireless communications systems do not provide signaling which enables UEs 115 to indicate a capability to maintain phase coherence across multiple uplink messages depending on differing channel usage characteristics (e.g., time duration between uplink messages, other scheduled communications). Without knowing a capability of UEs 115 to maintain phase coherency, the base station may be unable to efficiently schedule uplink messages used for channel estimation.

Accordingly, the UE 115-*a* and the base station 105-*a* of the wireless communications system 200 may support techniques which enable the UE 115-*a* to signal various capabilities for maintaining phase coherency across uplink messages. In particular, the UE 115-*a* and the base station 105-*a* may support capability signaling which enables the UE 115-*a* to indicate whether it supports various phase coherency capabilities. By enabling the UE 115-*a* to indicate supported phase coherency capabilities, techniques described herein may provide for improved phase coherency across uplink messages (e.g., SRSs, DMRSs) transmitted by the UE 115-*a*, which may result in more efficient channel estimation at the base station 105-*a*, thereby improving the efficiency and reliability of wireless communications within the wireless communications system 200.

For example, the UE 115-*a* may receive, from the base station 105-*a*, control signaling 215 which indicates a set of capability index values associated with a set of phase coherency capabilities. In other words, the control signaling 215 may indicate capability index values associated with a set of pre-defined phase coherency capabilities. Mappings between the capability index values and the respective phase coherency capabilities may be indicated via one or more tables. Moreover, the control signaling 215 indicating the capability index values may be indicated via an RRC message, a downlink control information (DCI) message, a synchronization signal block (SSB) message, a MAC control element (MAC-CE) message, or any combination thereof.

Each phase coherency capability may be associated with a capability of a UE 115 to maintain phase coherency across a set of uplink messages 230 within a time interval 220. For example, referring to a first resource configuration 210-*a* illustrated in FIG. 2, phase coherency capabilities may refer to a capability of the UE 115-*b* to maintain phase coherence across a set of uplink messages 230 (e.g., uplink messages 230-*a*, 230-*b*, 230-*c*, 230-*d*) within the time interval 220-*a*. Similarly, referring to second resource configuration 210-*b* illustrated in FIG. 2, phase coherency capabilities may refer to a capability of the UE 115-*b* to maintain phase coherence across a set of uplink messages 230 (e.g., uplink messages 230-*e*, 230-*f*, 230-*g*, 230-*h*) within the time interval 220-*b*. The time intervals 220-*a*, 220-*b* may include slots, set of slots, sets of symbols, sets of TTIs 225, or other time segment.

For the purposes of the present disclosure, phase coherence may be maintained across the uplink message 230 within the respective time intervals 220-*a*, 220-*b* if a phase difference between the respective uplink messages is less than or equal to a phase threshold. For example, referring to the first resource configuration 210-*a*, phase coherence may be maintained across uplink message 230-*b* and uplink message 230-*c* if a difference between a first phase associated with the uplink message 230-*b* and a second phase associated with the uplink message 230-*c* is less than or equal to a phase threshold.

The phase coherency capabilities may be based on one or more channel usage characteristics associated with the respective time interval 220 across which phase coherency across uplink messages 230 is to be maintained. In other words, the ability of the UE 115-*a* to support a phase coherency capability, and therefore maintain phase coherency across uplink messages 230 within a time interval 220, may be dependent upon a usage of time resources within the respective time interval 220. Parameters of channel usage characteristics may include a maximum length of the time interval 220 (e.g., maximum length of the coherence window), a maximum gap 235 between uplink messages 230 (e.g., maximum gap 235 between physical uplink shared channel (PUSCH) repetitions and/or TTIs 225 of the time interval 220), a presence of other uplink/downlink communications 245 scheduled between consecutive uplink messages 230 within the time interval 220, a type of other uplink/downlink communications 245 scheduled between consecutive uplink messages 230 within the time interval 220, and the like.

Additionally, or alternatively, the UE 115-*a* may be configured (e.g., pre-configured) with the set of capability index values and/or the set of pre-configured phase coherency capabilities. In such cases, the UE 115-*a* may be configured to determine which phase coherency capabilities it supports, and the corresponding capability index values, without explicit signaling from the base station 105-*a*.

In some implementations, the set of pre-defined phase coherency capabilities may be associated with a pre-defined hierarchy for being supported by the UE 115-*a*. For example, if the UE 115-*a* supports a first pre-defined phase coherency capability, the UE 115-*a* may also be understood to support a second pre-defined phase coherency capability (e.g., one or more lower phase coherency capabilities than the first pre-defined phase coherency capability) in accordance with a pre-defined hierarchy associated with the set of pre-defined phase coherency capabilities.

In some aspects, the UE 115-*a* may transmit capability signaling 240 which indicates one or more phase coherency capabilities of the UE 115-*a* for maintaining phase coherence across multiple uplink messages 230 within a time interval 220. In other words, the UE 115-*a* may transmit capability signaling 240 (e.g., a UE capability message) which indicates one or more phase coherency capabilities that it supports. In some aspects, the existence of a pre-defined phase coherency capability may reduce a quantity of data indicated via the capability signaling.

As noted previously herein, each phase coherency capability may be based on one or more channel usage characteristics associated with the respective time interval 220. In other words, referring to the first resource configuration 210-*a*, the capability of the UE 115-*a* to maintain phase coherency across uplink messages 230-*a*, 230-*b*, 230-*c*, 230-*d* (e.g., repetitions of PUSCH and/or physical uplink control channel (PUCCH) messages) within the time interval 220-*a* may be based on the usage of the time resources within the time interval 220-*a*.

In some aspects, the UE 115-*a* may transmit the capability signaling 240 based on (e.g., in response to) receiving the control signaling 215 indicating the capability index values. For example, the UE 115-*a* may transmit the capability signaling 240, where the capability signaling 240 indicates one or more capability index values associated with the one or more phase coherency capabilities supported by the UE 115-*a* which were indicated via the control signaling 215. In this regard, the UE 115-*a* may indicate which pre-defined phase coherency capabilities it supports by signaling the corresponding capability index values.

Additionally, or alternatively, the UE 115-*a* may dynamically indicate, via the capability signaling 240, one or more parameters of the channel usage characteristics associated with the respective time interval 220. In other words, the UE 115-*a* may indicate whether or not it may maintain phase coherence across uplink messages 230 within a time interval 220 based on (or despite) certain parameters of channel usage characteristics associated with the respective time interval 220. The one or more parameters of the channel usage characteristics associated with the respective time interval 220 may include a time threshold associated with a gap 235-*a* between consecutive uplink messages 230 and/or between TTIs 225, a downlink activity associated with the gap 235-*a* between consecutive uplink messages 230, an uplink activity associated with the gap 235-*a* between consecutive uplink messages 230, a maximum duration of the time interval 220, a phase coherency threshold, or any combination thereof. The terms "downlink activity" and "uplink activity" may refer to a presence and/or type of scheduled downlink communications 245 and scheduled uplink communications 245, respectively.

For example, referring to the first resource configuration 210-*a*, the UE 115-*a* may indicate, via the capability signaling 240, a maximum time threshold associated with a gap 235-*a* between consecutive uplink messages 230 and/or between TTIs 225-*a*, 225-*b* of the time interval 220-*a*. In this example, the UE 115-*a* may indicate that it may maintain phase coherency across the uplink messages 230-*a*, 230-*b*, 230-*c*, 230-*d* if the gap 235-*a* between the consecutive uplink messages 230 (e.g., gap 235-*a* between the first TTI 225-*a* and the second TTI 225-*b*) satisfies the maximum time threshold. Conversely, the capability signaling 240-*b* may indicate that the UE 115-*b* is unable to maintain phase coherency across the uplink messages 230-*a*, 230-*b*, 230-*c*, 230-*d* if the gap 235-*a* between the uplink messages 230-*b* and 230-*c* (or gap 235-*a* between the first TTI 225-*a* and second TTI 225-*b*) fails to satisfy the maximum time threshold. In some aspects, the gap 235-*a* may satisfy the maximum time threshold if a duration of the gap 235-*a* is less than or equal to the maximum time threshold.

By way of another example, the UE 115-*b* may indicate, via the capability signaling 240, a phase coherency threshold associated with the set of uplink messages 230 within the time interval 220-*a*. In this example, the UE 115-*a* may indicate that it may maintain phase coherency across the uplink messages 230-*a*, 230-*b*, 230-*c*, 230-*d* within the phase coherency threshold. In other words, the UE 115-*b* may indicate that it may transmit the uplink messages 230-*a*, 230-*b*, 230-*c*, 230-*d* with respective phases, where a difference between the respective phases is less than or equal to the phase coherency threshold.

The time interval 220 across which the UE 115-*a* may be configured to maintain phase coherency across uplink messages 230 (e.g., across which the UE 115-*a* may perform DMRS bundling) may include a slot, a set of slots, a set of TTIs 225, a set of symbols, and/or some other time segment. For example, referring to the first resource configuration 210-*a*, the time interval 220-*a* associated with the supported phase coherency capabilities may include a first TTI 225-*a* and a second TTI 225-*b*. Similarly, referring to the second resource configuration 210-*b*, the time interval 220-*b* associated with the supported phase coherency capabilities may include a first TTI 225-*c* and a second TTI 225-*c*. Respective phase coherency capabilities may be defined based on a relative arrangement between the first TTI 225-*a*, 225-*c* and the second TTI 225-*b*, 225-*d*, respectively, parameters associated with channel usage characteristics of the respective time intervals 220-*a*, 220-*b*, or any combination thereof.

Categories for uplink message 230 phase continuity/coherency depending on the usage of time resources may include the following: uplink message 230 phase continuity for consecutive (e.g., back-to-back) uplink messages 230; uplink message 230 phase continuity in the presence of a gap 235-*a* for other uplink/downlink communications between consecutive uplink messages 230; uplink message 230 phase continuity in the presence of a gap 235-*a* between consecutive uplink messages 230 and an additional gap 235-*b* for restoring phase/power; uplink message 230 phase continuity based on a maximum length of the time interval 220 (e.g., maximum length of the coherence window), or any combination thereof.

For example, in cases where the UE 115-*a* supports a first phase coherency capability, the UE 115-*a* may be configured to maintain phase coherence across uplink messages 230 within the first TTI 225-*a* and the second TTI 225-*a* of the first time interval 220-*a* based at least in part on a gap 235-*a* between the first TTI 225-*a* and the second TTI 225-*b* satisfying a time threshold. In some cases, the gap 235-*a* may satisfy the time threshold if the gap 235-*a* is less than or equal to the time threshold. For example, in accordance with the first phase coherency capability, the UE 115-*a* may be able to maintain phase coherence across uplink messages 230-*a*, 230-*b*, 230-*c*, 230-*d* within the first TTI 225-*a* and the second TTI 225-*b* if a gap 235-*a* between an end of the first TTI 225-*a* and a start of the second TTI 225-*b* is less than some time threshold. In some cases, the time threshold may be pre-configured, signaled to the UE 115-*a* via the control signaling 215, signaled to the base station 105-*a* via the capability signaling 240, or any combination thereof.

While the gap 235-*a* of the first resource configuration 210-*a* is shown and described as defining a time between the first TTI 225-*a* and the second TTI 225-*b*, this is provided solely for illustrative purposes. In additional or alternative cases, the gap 235-*a* may define a time duration between a last uplink message 230-*b* of the first TTI 225-*a* (e.g., uplink message 230-*b*) and a first uplink message of the second TTI 225-*b* (e.g., uplink message 230-*d*). In this regard, a gap 235-*a* may refer to a time duration between consecutive uplink messages 230 within the time interval 220-*a*.

By way of another example, in cases where the UE 115-*a* supports a second phase coherency capability, the UE 115-*a* may be configured to maintain phase coherence across uplink messages 230 within the first TTI 225-*a* and the second TTI 225-*b* of the time interval 220-*a* based on the first TTI 225-*a* and the second TTI 225-*b* including consecutive TTIs 225. In other words, the UE 115-*a* may be able to maintain phase coherency across uplink messages 230 within consecutive (e.g., back-to-back) TTIs 225 in accordance with the second phase coherency capability. In this regard, the UE 115-*b* may be able to maintain phase coherency across uplink messages 230 within the time interval 220-*a* based on an absence of the gap 235-*a* between the first TTI 225-*a* and the second TTI 225-*b*.

By way of another example, in cases where the UE 115-*a* supports a third phase coherency capability, the UE 115-*a* may be configured to maintain phase coherence across uplink messages 230 within the first TTI 225-*a* and the second TTI 225-*b* of the time interval 220-*a* based on an absence of additional uplink communications 245, an absence of additional downlink communications 245, or both, scheduled within the gap 235-*a* between the first TTI 225-*a* and the second TTI 225-*b*. In other words, in accordance with the third phase coherency capability, the UE 115-*a* may be able to maintain phase coherency across uplink messages 230-*a*, 230-*b*, 230-*c*, 230-*d* as long as there are no other communications 245 scheduled within the gap 235-*a* between the first TTI 225-*a* and the second TTI 225-*b* in the time domain.

By way of another example, in cases where the UE 115-*a* supports a fourth phase coherency capability, the UE 115-*a* may be configured to maintain phase coherence across uplink messages 230 within the first TTI 225-*a* and the second TTI 225-*b* of the time interval 220-*a* based on a type of additional uplink communications 245, a type of additional downlink communications 245, or both, scheduled within the gap 235-*a* between the first TTI 225-*a* and the second TTI 225-*b*. In other words, in accordance with the fourth phase coherency capability, the UE 115-*a* may be able to maintain phase coherency across uplink messages 230 based on a nature of the gap 235-*a* between the respective TTIs 225-*a*, 225-*b* of the time interval 220-*b*. The nature of the gap 235-*a* may be based on a type of downlink/uplink communications 245 (e.g., SRS, SSB, PUSCH, PUCCH, physical downlink shared channel (PDSCH), physical downlink control channel (PDCCH)) scheduled within the gap 235-*a*, a beam used to perform additional downlink/uplink communications 245 within the gap 235-*a*, and the like.

For instance, in accordance with the fourth phase coherency capability, the UE 115-*a* may be configured to maintain phase coherence across uplink messages 230-*a*, 230-*b*, 230-*c*, 230-*d* within the first TTI 225-*a* and the second TTI 225-*b* if the UE 115-*a* is scheduled to perform an SRS transmission (e.g., communication 245) within the gap 235-*a* between the first TTI 225-*a* and the second TTI 225-*b*, but may be unable to maintain phase coherence across uplink messages 230 within the first TTI 225-*a* and the second TTI 225-*a* if the UE 115-*a* is scheduled to receive a PDCCH message (e.g., communication 245-*b*) within the gap 235-*a*. In some aspects, types of uplink/downlink communications 245 and beams used to perform the uplink/downlink communications 245 scheduled within the gap 235-*a* between the first and second TTIs 225 which may be supported via the phase coherence capabilities at the UE 115-*a* may be pre-configured, signaled to the UE 115-*a* via the control signaling 215, signaled to the base station 105-*a* via the capability signaling 240, or any combination thereof.

By way of another example, referring to the second resource configuration 210-*b*, the UE 115-*a* may be scheduled/configured to transmit/receive a communication 245-*c* (e.g., uplink/downlink communication 245) within a third TTI 225-*e* positioned between the first TTI 225-*c* and the second TTI 225-*d* in the time domain. In this example, in cases where the UE 115-*a* supports a fifth phase coherency capability, the UE 115-*a* may be configured to maintain phase coherence across uplink messages 230-*e*, 230-*f*, 230-*g*, 230-*h* within the first TTI 225-*c* and the second TTI 225-*e* based on a gap 235-*b* between the third TTI 225-*e* and the second TTI 225-*d* satisfying a time threshold. In other words, the UE 115-*a* may be able to maintain phase coherence as long as the UE 115-*a* has an additional gap 235-*b* following communication 245-*c* for retuning RF components, restoring phase/power, and the like. In particular, the performance of the communication 245-*c* may require increased processing complexity, power consumption, and RF retuning.

While the gap 235-*b* of the second resource configuration 210-*b* is shown and described as defining a time between the third TTI 225-*e* and the second TTI 225-*d*, this is provided solely for illustrative purposes. In additional or alternative cases, the gap 235-*b* may define a time duration between the communication 245-*c* performed during the third TTI 225-*e* and a first uplink message 230 of the second TTI 225-*d* (e.g., uplink message 230-*g*). In this regard, a gap 235-*b* may refer to a time duration between the communication 245-*c* and the following uplink message 230 within the time interval 220-*b*.

By way of another example, in cases where the UE 115-*a* supports a sixth phase coherency capability, the UE 115-*a* may be configured to maintain phase coherence across uplink messages 230 within the first TTI 225-*a*, 225-*b* and the second TTI 225-*b*, 225-*d* of the respective time interval 220-*a*, 220-*b* based on the time interval 220-*a*, 220-*b* being less than or equal to a maximum time interval threshold. In other words, in accordance with the sixth phase coherency capability, the UE 115-*a* may be able to maintain phase coherence across uplink messages 230 based on a maximum length of the time interval 220 (e.g., maximum length of coherence window). In some cases, the maximum time interval 220 threshold may be pre-configured, signaled to the UE 115-*a* via the control signaling 215 at 305, signaled to the base station 105-*a* via the capability signaling 240, or any combination thereof.

In some aspects, the UE 115-*a* may receive, from the base station 105-*a*, a downlink message 250-*a* scheduling a set of uplink messages 230 (e.g., set of uplink messages 230-*a*, 230-*b*, 230-*c*, 230-*d*, or set of uplink messages 230-*e*, 230-*f*, 230-*g*, 230-*h*) from the UE 115-*a* to the base station 105-*a* within the time interval 220. In some aspects, the UE 115-*a* may receive the downlink message 250-*a* based on receiving the control signaling 215, transmitting the capability signaling 240, or both. In particular, the base station 105-*a* may transmit the downlink message 250-*a* scheduling the set of uplink messages 230 based on (e.g., in accordance with) the one or more phase coherence capabilities supported by the UE 115-*a*. In this regard, in some cases, the downlink message 250-*a* may instruct the UE 115-*a* to maintain phase coherence (e.g., perform DMRS bundling) across the set of scheduled uplink messages 230 based on at least one phase coherence capability supported by the UE 115-*a*. The downlink message 250-*a* my include a DCI message, a MAC-CE message, or both. Moreover, the uplink messages 230 scheduled by the downlink message 250-*a* may include SRSs, DMRSs, PUSCH messages, PUCCH messages, and the like.

Subsequently, the UE 115-*a* may transmit a first subset of the scheduled uplink messages 230 within the first TTI 225 of the time interval 220. For example, referring to the first resource configuration 210-*a*, the UE 115-*a* may transmit the uplink message 230-*a* and the uplink message 230-*b* within the first TTI 225-*a* of the time interval 220-*a*. By way of another example, referring to the second resource configuration 210-*b*, the UE 115-*a* may transmit the uplink message 230-*e* and the uplink message 230-*f* within the first TTI 225-*c* of the time interval 220-*b*. The UE 115-*a* may transmit the first subset of the uplink messages 230 within the first TTI 225 of the respective time interval 220 based on receiving the downlink message 250-*a*, and in accordance with the one or more phase coherency capabilities supported by the UE 115-*a*.

The UE 115-*a* may be configured to maintain phase coherence (e.g., perform DMRS bundling) across the first subset of uplink messages 230 transmitted within the first TTI 225 in accordance with at least one phase coherence capability supported by the UE 115-*a*. As noted previously herein, phase coherence may be maintained across uplink messages 230 if a phase difference between phases of the respective uplink messages 230 is less than or equal to a phase threshold (e.g., same relative phase among different RBs during the time window used for channel estimation). Moreover, in some cases, the UE 115-*a* may be configured to transmit each uplink message 230 within the first TTI 225 of the respective time interval 220 with a same, or approximately similar, transmission power in order to facilitate joint channel estimation at the base station 105-*a*.

In some aspects, the UE 115-*a*, the base station 105-*a*, or both, may be configured to perform communications within the gap 235-*a*, 235-*b* or third TTI 225-*e* which is positioned between the first TTI 225-*a*, 225-*c* and the second TTI 225-*b*, 225-*d* in the time domain. For example, referring to the second resource configuration 210-*b* and in accordance with the fourth phase coherency capability, the UE 115-*a* may be able to maintain phase coherence across uplink messages 230 within the first TTI 225-*c* and the second TTI 225-*d* of the time interval 220-*b* based on a type of the communication 245-*c* and/or a beam associated with communication 245-*c* performed within the third TTI 225-*e* positioned between the first TTI 225-*c* and the second TTI 225-*d* in the time domain.

The UE 115-*a* may transmit a second subset of the scheduled uplink messages 230 within the second TTI 225 of the time interval 220. For example, referring to the first resource configuration 210-*a*, the UE 115-*a* may transmit the uplink message 230-*c* a and the uplink message 230-*d* within the second TTI 225-*b* of the time interval 220-*a*. By way of another example, referring to the second resource configuration 210-*b*, the UE 115-*a* may transmit the uplink message 230-*g* and the uplink message 230-*h* within the second TTI 225-*d* of the time interval 220-*b*.

The UE 115-*a* may transmit the second subset of the uplink messages 230 within the second TTI 225 of the time interval 220 based on receiving the downlink message 250-*a*, and in accordance with the one or more phase coherency capabilities supported by the UE 115-*a*. Moreover, the UE 115-*a* may transmit the second subset of the uplink messages 230 within the second TTI 225 of the time interval 220 based on transmitting the first subset of uplink messages 230 within the first TTI 225, performing the communications within the gap 235-*a*, 235-*b* and/or third TTI 225-*e*, or both.

The UE 115-*a* may be configured to maintain phase coherence (e.g., perform DMRS bundling) across the second subset of uplink messages 230 transmitted within the second TTI 225 in accordance with at least one phase coherence capability supported by the UE 115-*a*. Moreover, the UE 115-*a* may be configured to maintain phase coherence across the first subset of uplink messages 230 within the first TTI 225 and the second subset of uplink messages 230 within the second TTI 225. For example, referring to the first resource configuration 210-*a*, the UE 115-*b* may be configured to maintain phase coherence across the first subset of uplink messages 230-*a*, 230-*b* within the first TTI 225-*a* and the second subset of uplink messages 230-*c*, 230-*d* within the second TTI 225-*b*.

In some cases, the UE 115-*a* may be configured to transmit each uplink message 230 within the second TTI 225 of the time interval 220 with a same, or approximately similar, transmission power in order to facilitate joint channel estimation at the base station 105-*a*. Moreover, the UE 115-*a* may be configured to transmit each uplink message 230 within the second TTI 225 with the same, or approximately similar, transmission power as the transmission power associated with the first subset of uplink messages 230 transmitted within the first TTI 225. For example, referring to the first resource configuration 210-*a*, the UE 115-*b* may be configured to transmit each of the uplink messages 230-*a*, 230-*b* within the first TTI 225-*a* and each of the uplink messages 230-*c*, 230-*d* within the second TTI 225-*b* with a same, or substantially similar, transmission power.

The base station 105-*a* may determine a channel estimate associated with a channel between the UE 115-*a* and the base station 105-*a*. In particular, the base station 105-*a* may perform channel estimation based on the uplink messages 230 received within the first TTI 225 and the second TTI 225 of the time interval 220 (e.g., uplink messages 230 received at 320 and 330, respectively). In this regard, the base station 105-*a* may be configured to perform wideband estimation (e.g., joint channel estimation) of the relative phase between uplink messages 230 received within the time interval 220. In other words, the base station 105-*a* may be configured to perform joint channel estimation in which the phase coherent uplink messages 230 received within the time interval 220 are jointly considered (e.g., coherently combined) in order to perform channel estimation.

In some aspects, the base station 105-*a* may perform the channel estimate at 335 based on one or more phase coherency assumptions associated with the uplink messages 230 received within the time interval 220. Phase coherency assumptions may include assumptions regarding a relative or expected phase coherency across uplink messages 230 transmitted by the UE 115-*a*. In this regard, the base station 105-a may be configured to determine one or more phase coherency assumptions based on the supported phase coherence capabilities supported by the UE 115-a, and perform the channel estimate based on the determined phase coherency assumptions.

In some aspects, the base station 105-a may decode the uplink messages 230 received within the first TTI 225 and the second TTI 225 of the time interval 220. In some aspects, the base station 105-a may decode the uplink messages 230 at 335 based on the one or more phase coherency assumptions associated with the uplink messages 230 received within the time interval 220. In this regard, the base station 105-a may be configured to decode the received uplink messages 230 based on receiving the capability signaling 240, receiving the uplink messages 230, determining phase coherency assumptions, and the like.

In some implementations, the UE 115-a may transmit additional capability signaling 240-b indicating one or more modifications to the one or more phase coherency capabilities supported by the UE 115-a. In this regard, the UE 115-a may dynamically indicate a change in its supported phase coherency capabilities via uplink control information (UCI) messaging, PUCCH signaling, UE capability messaging, or any combination thereof.

The additional capability signaling 240-b may indicate modifications to supported phase coherency capabilities by indicating that the UE 115-a no longer supports a previously-supported phase coherency capability, by indicating that the UE 115-a supports a previously un-supported phase coherency capability, or both. Additionally, or alternatively, the additional capability signaling 240-b may indicate modifications to supported phase coherency capabilities by indicating modifications to one or more parameters associated with channel usage characteristics of supported phase coherence capabilities. For example, the additional capability signaling 240-b may indicate new time threshold, or new maximum time interval 220 threshold across which it is able to maintain phase coherence across uplink messages 230.

Subsequently, the UE 115-a may receive, from the base station 105-a, an additional downlink message 250-b scheduling a second set of uplink messages 230 from the UE 115-a to the base station 105-a within a second time interval 220. In some aspects, the UE 115-a may receive the downlink message 250-b at 350 based on transmitting the additional capability signaling 240-b indicating modifications to supported phase coherency capabilities. In particular, the base station 105-a may transmit the additional downlink message 250-b scheduling the second set of uplink messages 230 based on (e.g., in accordance with) the one or more modifications to the phase coherence capabilities supported by the UE 115-a. The additional downlink message 250-b my include a DCI message, a MAC-CE message, or both. Moreover, the uplink messages 230 scheduled by the additional downlink message 250-b may include SRSs, DMRSs, PUSCH messages, PUCCH messages, and the like.

Subsequently, the UE 115-a may transmit the second set of uplink messages 230 within the second time interval 220 (e.g., a time interval 220 which is subsequent to the time interval 220-a or time interval 220-b in the time domain). The UE 115-a may transmit the second set of uplink messages 230 within the second time interval 220 based on receiving the additional downlink message 250-b, and in accordance with the one or more modifications to the phase coherency capabilities supported by the UE 115-a which were indicated via the additional capability signaling 240-b. As noted previously herein, the UE 115-a may transmit the second set of uplink messages 230 within multiple TTIs 225 of the second time interval 220.

Techniques described herein may enable the UE 115-a to report one or more supported phase coherency capabilities for maintaining phase coherence across multiple uplink messages 230. Enabling the UE 115-a to report supported phase coherency capabilities may improve the ability of the base station 105-a of the wireless communications system to schedule uplink messages 230 at the UE 115-a in accordance with supported phase coherency capabilities at the respective UE 115-a. As such, techniques described herein may improve phase coherency of uplink messages 230 transmitted by the UE 115-a, which may facilitate channel estimation at the base station 105-a, thereby leading to more efficient and reliable wireless communications within the wireless communications system.

Figure 3:
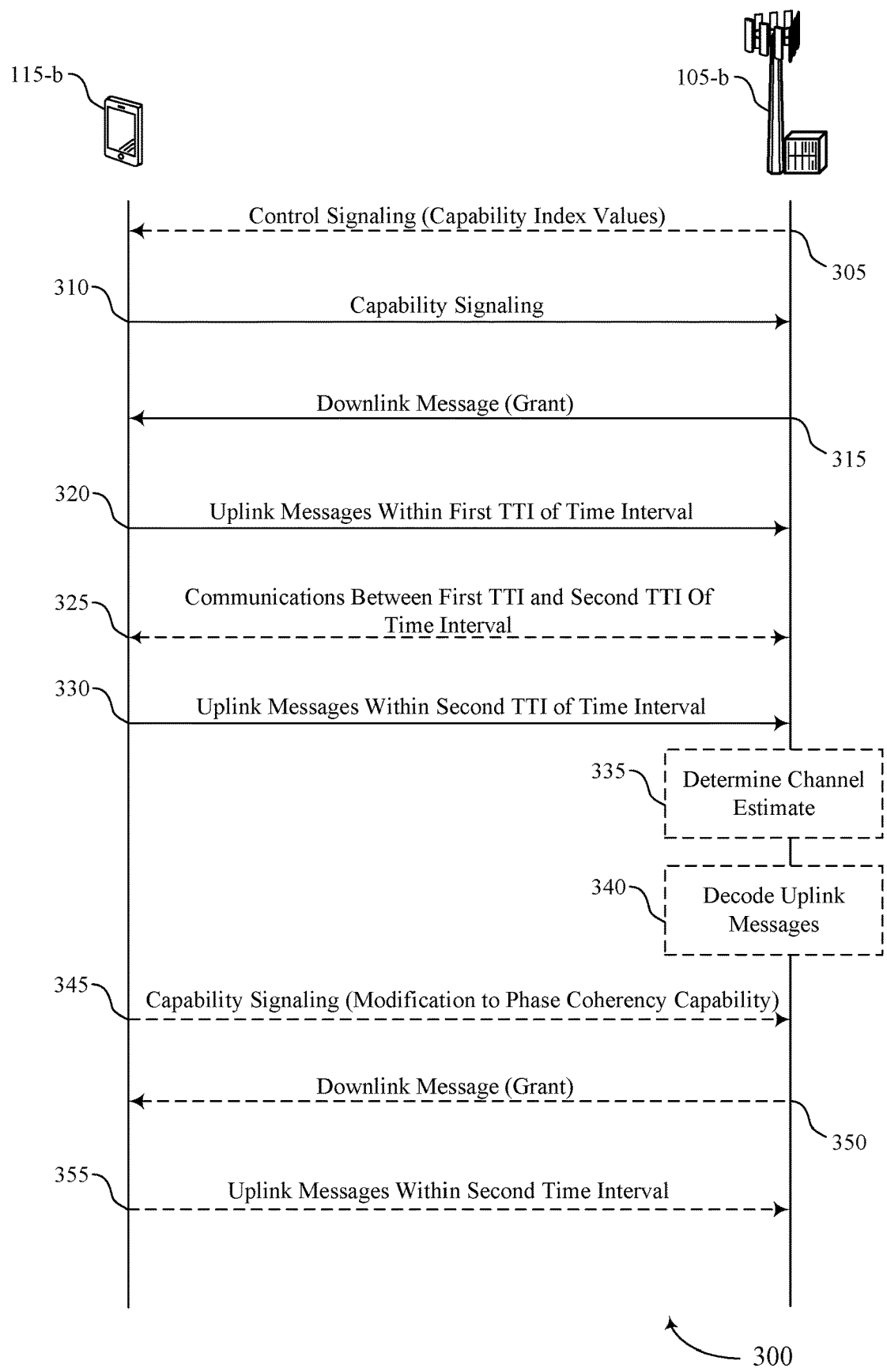
FIG. 3 illustrates an example of a process flow that supports techniques for reporting uplink transmission continuity capability in accordance with aspects of the present disclosure.

FIG. 3 illustrates an example of a process flow 300 that supports techniques for reporting uplink transmission continuity capability in accordance with aspects of the present disclosure. In some examples, process flow 300 may implement, or be implemented by, aspects of wireless communications systems 100, wireless communications system 200, or both. For example, the process flow 300 may illustrate a UE 115-b transmitting capability signaling indicating supported phase coherency capabilities, receiving a grant which schedules uplink transmissions based on the supported phase coherency capabilities, and transmitting the scheduled uplink messages based on the grant and in accordance with the supported phase coherency capabilities, as described with reference to FIGS. 1-2.

In some cases, process flow 300 may include a UE 115-b and a base station 105-b, which may be examples of corresponding devices as described herein. For example, the UE 115-b and the base station 105-b illustrated in FIG. 4 may be examples of UE 115-a and the base station 105-b illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-b may receive, from the base station 105-b, control signaling which indicates a set of capability index values associated with a set of phase coherency capabilities. In other words, the control signaling may indicate capability index values associated with a set of pre-defined phase coherency capabilities. Mappings between the capability index values and the respective phase coherency capabilities may be indicated via one or more tables. Moreover, the control signaling indicating the capability index values may be indicated via an RRC message, a DCI message, an SSB message, a MAC-CE message, or any combination thereof.

The phase coherency capabilities may be based on one or more channel usage characteristics associated with a time interval. In other words, the ability of a UE 115-b to support a phase coherency capability, and therefore maintain phase coherence across uplink messages within a time interval, may be dependent upon a usage of time resources within the respective time interval. Parameters of channel usage characteristics may include a maximum length of the time interval (e.g., maximum length of the coherence window), a maximum gap between uplink messages (e.g., maximum gap between PUSCH repetitions), a presence of other uplink/downlink messages scheduled between consecutive uplink messages within the time interval, a type of other uplink/downlink messages scheduled between consecutive uplink messages within the time interval, and the like.

Additionally, or alternatively, the UE 115-*b* may be configured (e.g., pre-configured) with the set of capability index values and/or the set of pre-configured phase coherency capabilities. In such cases, the UE 115-*b* may be configured to determine which phase coherency capabilities it supports, and the corresponding capability index values, without explicit signaling from the base station 105-*b*.

At 310, the UE 115-*b* may transmit capability signaling which indicates one or more phase coherency capabilities of the UE 115-*b* for maintaining phase coherence across multiple uplink messages within a time interval (e.g., slot, set of slots, set of symbols, TTI, or other time segment). In other words, the UE 115-*b* may transmit capability signaling (e.g., UE capability message) which indicates one or more phase coherency capabilities that it supports. Phase coherence may be maintained across uplink messages if a phase difference between phases of the respective uplink messages is less than or equal to a phase threshold.

As noted previously herein, each phase coherency capability may be based on one or more channel usage characteristics associated with the time interval. In other words, the capability of the UE 115-*b* to maintain phase coherency across uplink messages (e.g., repetitions of PUSCH and/or PUCCH messages) within the time interval may be based on the usage of the time resources within the time interval.

In some aspects, the UE 115-*b* may transmit the capability signaling based on (e.g., in response to) receiving the control signaling indicating the capability index values at 305. For example, the UE 115-*b* may transmit the capability signaling, where the capability signaling indicates one or more capability index values associated with the one or more phase coherency capabilities supported by the UE 115-*b*. In this regard, the UE 115-*b* may indicate which pre-defined phase coherency capabilities it supports by signaling the corresponding capability index values.

Additionally, or alternatively, the UE 115-*b* may indicate, via the capability signaling, one or more parameters of the channel usage characteristics associated with the time interval. In other words, the UE 115-*b* may indicate whether or not it may maintain phase coherence across uplink messages within a time interval based on (or despite) certain parameters of channel usage characteristics associated with the time interval. The one or more parameters of the channel usage characteristics associated with the time interval may include a time threshold associated with a gap between consecutive uplink messages, a downlink activity associated with the gap between consecutive uplink messages, an uplink activity associated with the gap between consecutive uplink messages, a maximum duration of the time interval, a phase coherency threshold, or any combination thereof. The terms "downlink activity" and "uplink activity" may refer to a presence and/or type of scheduled downlink messages and scheduled uplink messages, respectively.

For example, the UE 115-*b* may indicate, via the capability control signaling, a maximum time threshold associated with a gap between consecutive uplink messages. In this example, the UE 115-*b* may indicate that it may maintain phase coherency across the consecutive uplink messages if the gap between the consecutive uplink messages satisfies the maximum time threshold, and may be unable to maintain phase coherency across the consecutive uplink messages if the gap between the consecutive uplink messages fails to satisfy the maximum time threshold. In some aspects, the gap may satisfy the maximum time threshold if a duration of the gap is less than or equal to the maximum time threshold.

The time interval across which the UE 115-*b* may be configured to maintain phase coherency across uplink messages (e.g., across which the UE 115-*b* may perform DMRS bundling) may include a slot, a set of slots, a set of TTIs, a set of symbols, and/or some other time segment. For example, the time interval associated with the supported phase coherency capabilities may include a first TTI and a second TTI. Respective phase coherency capabilities may be defined based on a relative arrangement between the first TTI and the second TTI, parameters associated with channel usage characteristics of the time interval, or any combination thereof.

Categories for uplink message phase continuity/coherency depending on the usage of time resources may include the following: uplink message phase continuity for consecutive (e.g., back-to-back) uplink messages; uplink message phase continuity in the presence of a gap for other uplink/downlink messages between consecutive uplink messages; uplink message phase continuity in the presence of a gap between consecutive uplink messages and an additional gap for restoring phase/power; uplink message phase continuity based on a maximum length of the time interval (e.g., maximum length of the coherence window), or any combination thereof.

For example, in cases where the UE 115-*b* supports a first phase coherency capability, the UE 115-*b* may be configured to maintain phase coherence across uplink messages within the first TTI and the second TTI of the time interval based at least in part on a gap between the first TTI and the second TTI satisfying a time threshold. In some cases, the gap may satisfy the time threshold if the gap is less than or equal to the time threshold. For example, in accordance with the first phase coherency capability, the UE 115-*b* may be able to maintain phase coherence across uplink messages within the first TTI and the second TTI if a gap between an end of the first TTI and a start of the second TTI is less than some time threshold. In some cases, the time threshold may be pre-configured, signaled to the UE 115-*b* via the control signaling at 305, signaled to the base station 105-*b* via the capability signaling at 310, or any combination thereof.

By way of another example, in cases where the UE 115-*b* supports a second phase coherency capability, the UE 115-*b* may be configured to maintain phase coherence across uplink messages within the first TTI and the second TTI of the time interval based on the first TTI and the second TTI including consecutive TTIs. In other words, the UE 115-*b* may be able to maintain phase coherency across uplink messages within consecutive (e.g., back-to-back) TTIs in accordance with the second phase coherency capability.

By way of another example, in cases where the UE 115-*b* supports a third phase coherency capability, the UE 115-*b* may be configured to maintain phase coherence across uplink messages within the first TTI and the second TTI of the time interval based on an absence of additional uplink communications, an absence of additional downlink communications, or both, scheduled within a gap between the first TTI and the second TTI. In other words, in accordance with the third phase coherency capability, the UE 115-*b* may be able to maintain phase coherency across uplink messages as long as there are no other communications scheduled within the gap between the first TTI and the second TTI in the time domain.

By way of another example, in cases where the UE 115-*b* supports a fourth phase coherency capability, the UE 115-*b* may be configured to maintain phase coherence across uplink messages within the first TTI and the second TTI of the time interval based on a type of additional uplink communications, a type of additional downlink communications, or both, scheduled within a gap between the first TTI and the second TTI. In other words, in accordance with the fourth phase coherency capability, the UE 115-*b* may be able to maintain phase coherency across uplink messages based on a nature of a gap between the respective TTIs of the time interval. The nature of the gap may be based on a type of downlink/uplink communications (e.g., SRS, SSB, PUSCH, PUCCH, PDSCH, PDCCH) scheduled within the gap, a beam used to perform additional downlink/uplink communications within the gap, and the like.

For instance, in accordance with the fourth phase coherency capability, the UE 115-*b* may be configured to maintain phase coherence across uplink messages within the first TTI and the second TTI if the UE 115-*b* is scheduled to perform an SRS transmission within a gap between the first TTI and the second TTI, but may be unable to maintain phase coherence across uplink messages within the first TTI and the second TTI if the UE 115-*b* is scheduled to receive a PDCCH message within the gap. In some aspects, types of uplink/downlink communications and beams used to perform the uplink/downlink communications scheduled within the gap between the first and second TTIs which may be supported via the phase coherence capabilities at the UE 115-*b* may be pre-configured, signaled to the UE 115-*b* via the control signaling at 305, signaled to the base station 105-*b* via the capability signaling at 310, or any combination thereof.

By way of another example, in cases where the UE 115-*b* supports a fifth phase coherency capability and transmits/receives an uplink/downlink message within a third TTI between the first and second TTIs of the time interval, the UE 115-*b* may be configured to maintain phase coherence across uplink messages within the first TTI and the second TTI based on a gap between the third TTI and the second TTI satisfying a time threshold. In other words, the UE 115-*b* may be able to maintain phase coherence as long as the UE 115-*b* has an additional gap for retuning RF components, restoring phase/power, and the like.

By way of another example, in cases where the UE 115-*b* supports a sixth phase coherency capability the UE 115-*b* may be configured to maintain phase coherence across uplink messages within the first TTI and the second TTI of the time interval based on the time interval being less than or equal to a maximum time interval threshold. In other words, in accordance with the sixth phase coherency capability, the UE 115-*b* may be able to maintain phase coherence across uplink messages based on a maximum length of the time interval (e.g., maximum length of coherence window). In some cases, the maximum time interval threshold may be pre-configured, signaled to the UE 115-*b* via the control signaling at 305, signaled to the base station 105-*b* via the capability signaling at 310, or any combination thereof.

At 315, the UE 115-*b* may receive, from the base station 105-*b*, a downlink message scheduling a set of uplink messages from the UE 115-*b* to the base station 105-*b* within the time interval. In some aspects, the UE 115-*b* may receive the downlink message at 315 based on receiving the control signaling at 305, transmitting the capability signaling at 310, or both. In particular, the base station 105-*b* may transmit the downlink message scheduling the set of uplink messages based on (e.g., in accordance with) the one or more phase coherence capabilities supported by the UE 115-*b*. In this regard, in some cases, the downlink message may instruct the UE 115-*b* to maintain phase coherence (e.g., perform DMRS bundling) across the set of scheduled uplink messages based on at least one phase coherence capability supported by the UE 115-*b*. The downlink message my include a DCI message, a MAC-CE message, or both. Moreover, the uplink messages scheduled by the downlink message may include SRSs, DMRSs, PUSCH messages, PUCCH messages, and the like.

At 320, the UE 115-*b* may transmit a first subset of the scheduled uplink messages within the first TTI of the time interval. The UE 115-*b* may transmit the first subset of the uplink messages within the first TTI of the time interval based on receiving the downlink message at 315, and in accordance with the one or more phase coherency capabilities supported by the UE 115-*b*.

The UE 115-*b* may be configured to maintain phase coherence (e.g., perform DMRS bundling) across the first subset of uplink messages transmitted within the first TTI in accordance with at least one phase coherence capability supported by the UE 115-*b*. As noted previously herein, phase coherence may be maintained across uplink messages if a phase difference between phases of the respective uplink messages is less than or equal to a phase threshold (e.g., same relative phase among different RBs during the time window used for channel estimation). Moreover, in some cases, the UE 115-*b* may be configured to transmit each uplink message within the first TTI of the time interval with a same, or approximately similar, transmission power in order to facilitate joint channel estimation at the base station 105-*b*.

At 325, the UE 115-*b*, the base station 105-*b*, or both, may be configured to perform communications within gap or third TTI which is positioned between the first TTI and the second TTI in the time domain. For example, in accordance with the fourth phase coherency capability, the UE 115-*b* may be able to maintain phase coherence across uplink messages within the first and second TTI based on a type of communications and/or a beam associated with communications performed within a third TTI positioned between the first and second TTIs in the time domain. As such, the UE 115-*b* may be configured to transmit uplink communications and/or receive downlink communications within a gap and/or third TTI which is positioned between the first TTI and the second TTI in the time domain.

At 330, the UE 115-*b* may transmit a second subset of the scheduled uplink messages within the second TTI of the time interval. The UE 115-*b* may transmit the second subset of the uplink messages within the second TTI of the time interval based on receiving the downlink message at 315, and in accordance with the one or more phase coherency capabilities supported by the UE 115-*b*. Moreover, the UE 115-*b* may transmit the second subset of the uplink messages within the second TTI of the time interval based on transmitting the first subset of uplink messages at 320, performing the communications within the gap/third TTI at 325, or both.

The UE 115-*b* may be configured to maintain phase coherence (e.g., perform DMRS bundling) across the second subset of uplink messages transmitted within the second TTI in accordance with at least one phase coherence capability supported by the UE 115-*b*. Moreover, the UE 115-*b* may be configured to maintain phase coherence across the first subset of uplink messages within the first TTI and the second subset of uplink messages within the second TTI. In some cases, the UE 115-*b* may be configured to transmit each uplink message within the second TTI of the time interval with a same, or approximately similar, transmission power in order to facilitate joint channel estimation at the base station 105-*b*. Moreover, the UE 115-*b* may be configured to transmit each uplink message within the second TTI with the same, or approximately similar, transmission power as the transmission power associated with the first subset of uplink messages transmitted within the first TTI.

At 335, the base station 105-*b* may determine a channel estimate associated with a channel between the UE 115-*b* and the base station 105-*b*. In particular, the base station 105-*b* may perform channel estimation based on the uplink messages received within the first TTI and the second TTI of the time interval (e.g., uplink messages received at 320 and 330, respectively). In this regard, the base station 105-*b* may be configured to perform wideband estimation (e.g., joint channel estimation) of the relative phase between uplink messages received within the time interval. In other words, the base station 105-*b* may be configured to perform joint channel estimation in which the phase coherent uplink messages received within the time interval are jointly considered (e.g., coherently combined) in order to perform channel estimation.

In some aspects, the base station 105-*b* may perform the channel estimate at 335 based on one or more phase coherency assumptions associated with the uplink messages received within the time interval. Phase coherency assumptions may include assumptions regarding a relative or expected phase coherency across uplink messages transmitted by the UE 115-*b*. In this regard, the base station 105-*b* may be configured to determine one or more phase coherency assumptions based on the supported phase coherence capabilities supported by the UE 115-*b*, and perform the channel estimate based on the determined phase coherency assumptions.

At 340, the base station 105-*b* may decode the uplink messages received within the first TTI and the second TTI of the time interval (e.g., uplink messages received at 320 and 330, respectively). In some aspects, the base station 105-*b* may decode the uplink messages at 335 based on the one or more phase coherency assumptions associated with the uplink messages received within the time interval. In this regard, the base station 105-*b* may be configured to decode the received uplink messages based on receiving the capability signaling at 310, receiving the uplink messages, determining phase coherency assumptions, and the like.

At 345, the UE 115-*b* may transmit additional capability signaling indicating one or more modifications to the one or more phase coherency capabilities supported by the UE 115-*b*. In this regard, the UE 115-*b* may dynamically indicate a change in its supported phase coherency capabilities via UCI messaging, PUCCH signaling, UE capability messaging, or any combination thereof.

The additional capability signaling may indicate modifications to supported phase coherency capabilities by indicating that the UE 115-*b* no longer supports a previously-supported phase coherency capability, by indicating that the UE 115-*b* supports a previously un-supported phase coherency capability, or both. Additionally, or alternatively, the additional capability signaling may indicate modifications to supported phase coherency capabilities by indicating modifications to one or more parameters associated with channel usage characteristics of supported phase coherence capabilities. For example, the additional capability signaling may indicate new time threshold, or new maximum time interval threshold across which it is able to maintain phase coherence across uplink messages.

At 350, the UE 115-*b* may receive, from the base station 105-*b*, an additional downlink message scheduling a second set of uplink messages from the UE 115-*b* to the base station 105-*b* within a second time interval. In some aspects, the UE 115-*b* may receive the downlink message at 350 based on transmitting the additional capability signaling indicating modifications to supported phase coherency capabilities at 345. In particular, the base station 105-*b* may transmit the additional downlink message scheduling the second set of uplink messages based on (e.g., in accordance with) the one or more modifications to the phase coherence capabilities supported by the UE 115-*b*. The additional downlink message my include a DCI message, a MAC-CE message, or both. Moreover, the uplink messages scheduled by the additional downlink message may include SRSs, DMRSs, PUSCH messages, PUCCH messages, and the like.

At 355, the UE 115-*b* may transmit the second set of uplink messages within the second time interval. The UE 115-*b* may transmit the second set of uplink messages within the second time interval based on receiving the additional downlink message at 350, and in accordance with the one or more modifications to the phase coherency capabilities supported by the UE 115-*b* which were indicated at 345. As noted previously herein, the UE 115-*b* may transmit the second set of uplink messages within multiple TTIs of the second time interval.

Techniques described herein may enable the UE 115-*b* to report one or more supported phase coherency capabilities for maintaining phase coherence across multiple uplink messages. Enabling the UE 115-*b* to report supported phase coherency capabilities may improve the ability of the base station 105-*b* of the wireless communications system to schedule uplink messages at the UE 115-*b* in accordance with supported phase coherency capabilities at the respective UE 115-*b*. As such, techniques described herein may improve phase coherency of uplink messages transmitted by the UE 115-*b*, which may facilitate channel estimation at the base station 105-*b*, thereby leading to more efficient and reliable wireless communications within the wireless communications system.

Figure 4:
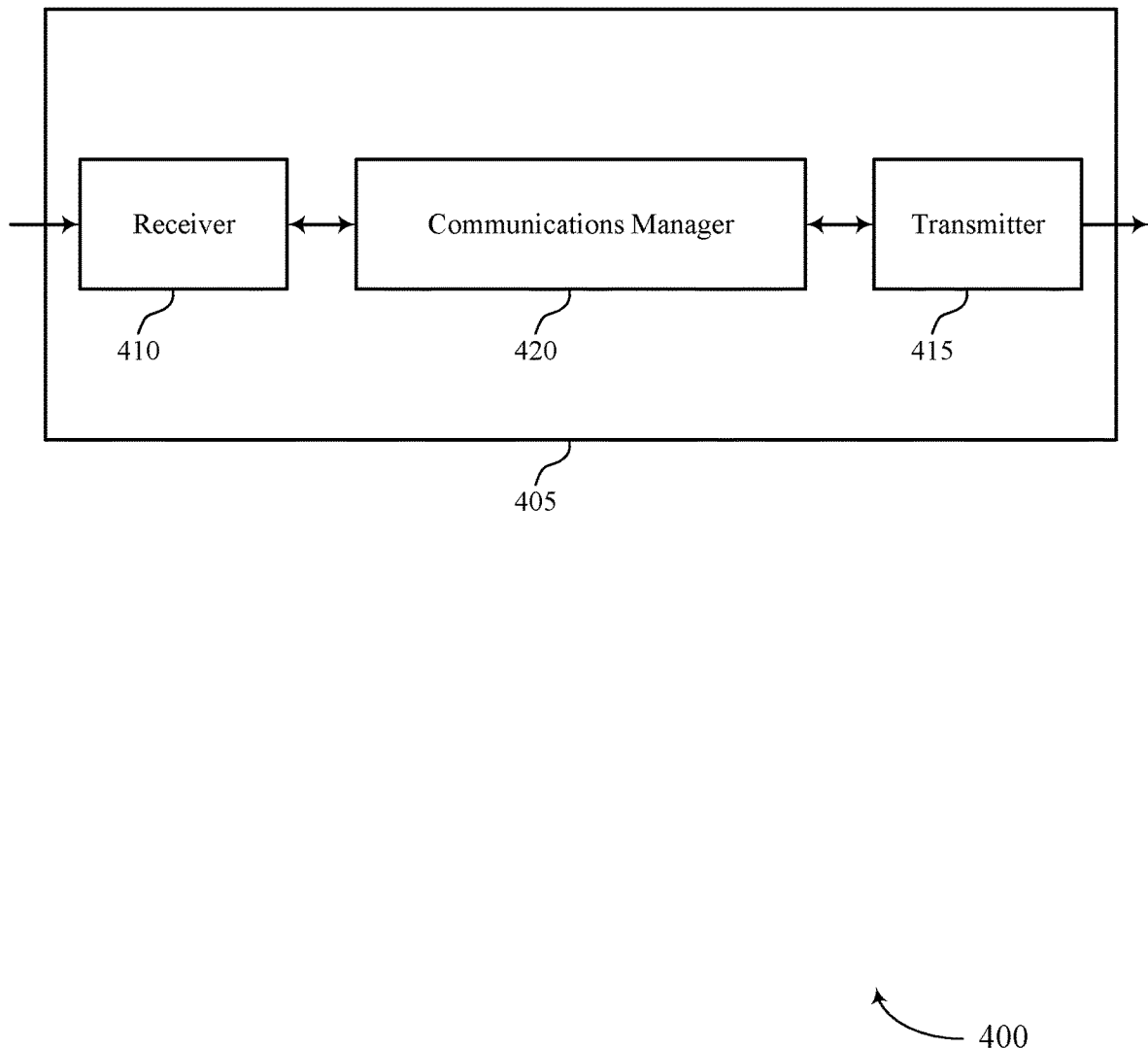
FIGS. 4 and 5 show block diagrams of devices that support techniques for reporting uplink transmission continuity capability in accordance with aspects of the present disclosure.

FIG. 4 shows a block diagram 400 of a device 405 that supports techniques for reporting uplink transmission continuity capability in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for reporting uplink transmission continuity capability). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for reporting uplink transmission continuity capability). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for reporting uplink transmission continuity capability as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The communications manager 420 may be configured as or otherwise support a means for receiving, from the base station, a downlink message scheduling a set of multiple uplink messages from the UE to the base station within the time interval. The communications manager 420 may be configured as or otherwise support a means for transmitting the set of multiple uplink messages within the time interval based on the downlink message and in accordance with at least one of the one or more phase coherency capabilities.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reporting one or more supported phase coherency capabilities for maintaining phase coherence across multiple uplink messages. Enabling UEs 115 to report supported phase coherency capabilities may improve the ability of the base stations 105 of the wireless communications system to schedule uplink messages at the UEs 115 in accordance with supported phase coherency capabilities at the respective UEs 115. As such, techniques described herein may improve phase coherency of uplink messages transmitted by the UEs 115, which may facilitate channel estimation at the base stations 105, thereby leading to more efficient and reliable wireless communications within the wireless communications system 100.

Figure 5:
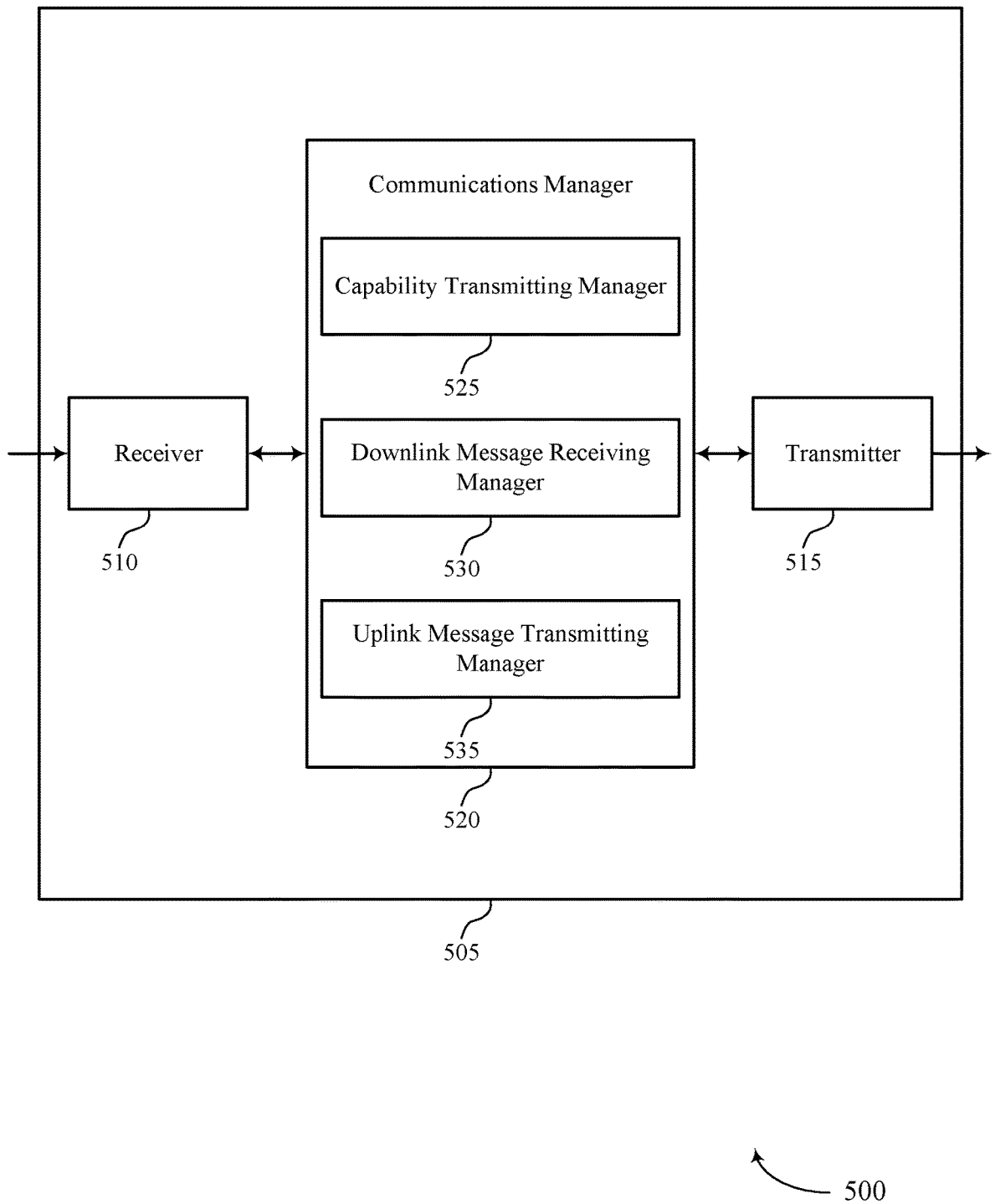

FIG. 5 shows a block diagram 500 of a device 505 that supports techniques for reporting uplink transmission continuity capability in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reporting uplink transmission continuity capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reporting uplink transmission continuity capability). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for reporting uplink transmission continuity capability as described herein. For example, the communications manager 520 may include a capability transmitting manager 525, a downlink message receiving manager 530, an uplink message transmitting manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The capability transmitting manager 525 may be configured as or otherwise support a means for transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The downlink message receiving manager 530 may be configured as or otherwise support a means for receiving, from the base station, a downlink message scheduling a set of multiple uplink messages from the UE to the base station within the time interval. The uplink message transmitting manager 535 may be configured as or otherwise support a means for transmitting the set of multiple uplink messages within the time interval based on the downlink message and in accordance with at least one of the one or more phase coherency capabilities.

Figure 6:
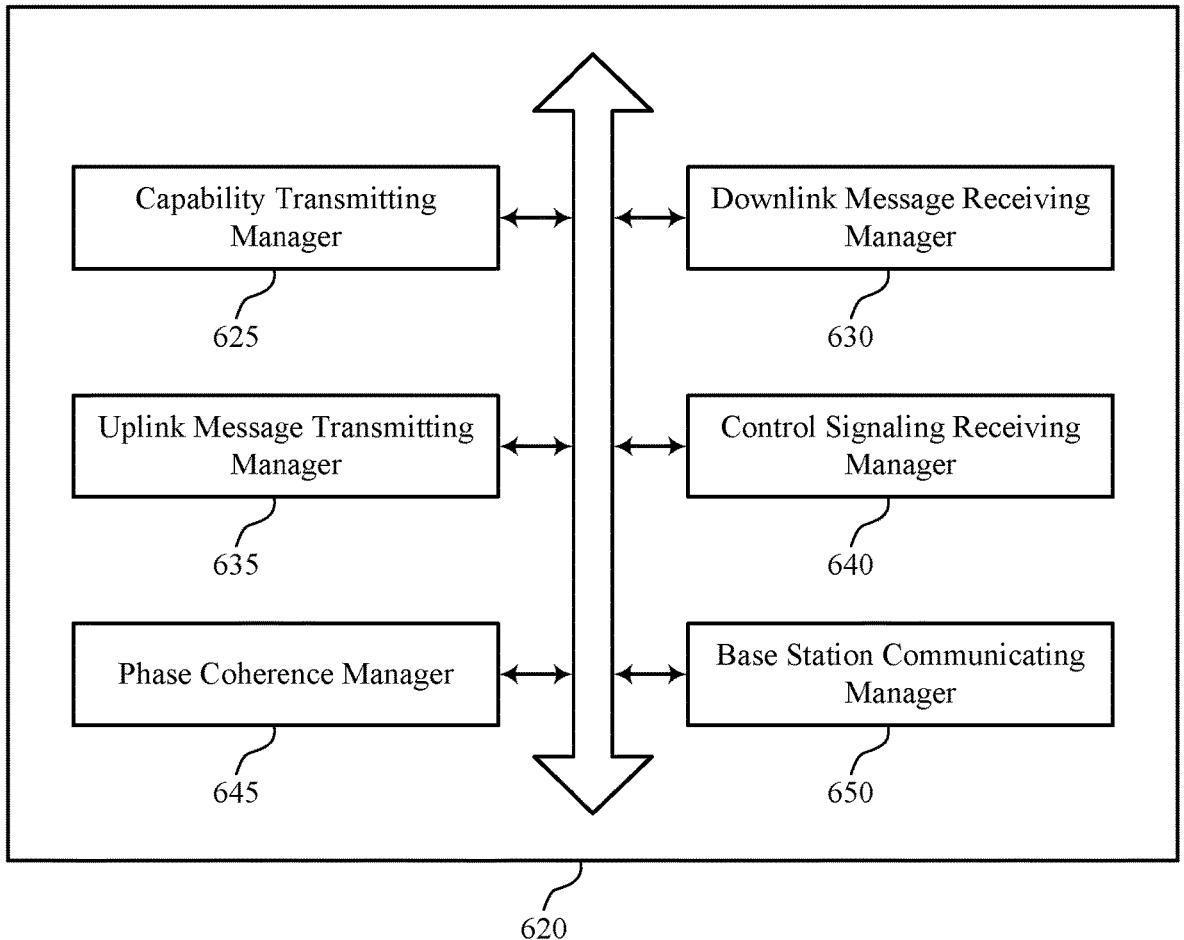
FIG. 6 shows a block diagram of a communications manager that supports techniques for reporting uplink transmission continuity capability in accordance with aspects of the present disclosure.

FIG. 6 shows a block diagram 600 of a communications manager 620 that supports techniques for reporting uplink transmission continuity capability in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for reporting uplink transmission continuity capability as described herein. For example, the communications manager 620 may include a capability transmitting manager 625, a downlink message receiving manager 630, an uplink message transmitting manager 635, a control signaling receiving manager 640, a phase coherence manager 645, a base station communicating manager 650, or any combination thereof. Each of these components may communicate, directly or indirectly, with one another (e.g., via one or more buses).

The communications manager 620 may support wireless communication at a UE in accordance with examples as disclosed herein. The capability transmitting manager 625 may be configured as or otherwise support a means for transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The downlink message receiving manager 630 may be configured as or otherwise support a means for receiving, from the base station, a downlink message scheduling a set of multiple uplink messages from the UE to the base station within the time interval. The uplink message transmitting manager 635 may be configured as or otherwise support a means for transmitting the set of multiple uplink messages within the time interval based on the downlink message and in accordance with at least one of the one or more phase coherency capabilities.

In some examples, to support transmitting the capability signaling, the capability transmitting manager 625 may be configured as or otherwise support a means for transmitting the capability signaling indicating one or more capability index values associated with the one or more phase coherency capabilities.

In some examples, the control signaling receiving manager 640 may be configured as or otherwise support a means for receiving, from the base station, control signaling indicating a set of multiple capability index values associated with a set of multiple phase coherency capabilities, where the set of multiple capability index values include the one or more capability index values, where the set of multiple phase coherency capabilities include the one or more phase coherency capabilities, and where transmitting the one or more capability index values is based on receiving the control signaling. In some examples, the capability signaling indicates one or more parameters of the one or more channel usage characteristics associated with the time interval.

In some examples, the one or more parameters of the one or more channel usage characteristics include a time threshold associated with a gap between consecutive uplink messages of the set of multiple uplink messages, a downlink activity associated with the gap between consecutive uplink messages of the set of multiple uplink messages of the time interval, an uplink activity associated with the gap between consecutive uplink messages of the set of multiple uplink messages of the time interval, a maximum duration of the time interval, a phase coherency threshold, or any combination thereof.

In some examples, the time interval includes a first TTI and a second TTI. In some examples, phase coherence is maintained across uplink messages of the set of multiple uplink messages if a phase difference between phases of the respective uplink messages is less than or equal to a phase threshold.

In some examples, to support a first phase coherency capability of the set of multiple phase coherency capabilities, the phase coherence manager 645 may be configured as or otherwise support a means for maintaining phase coherence across uplink messages of the set of multiple uplink messages within the first TTI and the second TTI based on a gap between the first TTI and the second TTI satisfying a time threshold. In some examples, the gap satisfies the time threshold if the gap is less than or equal to the time threshold.

In some examples, to support a second phase coherency capability of the set of multiple phase coherency capabilities, the phase coherence manager 645 may be configured as or otherwise support a means for maintaining phase coherence across uplink messages of the set of multiple uplink messages within the first TTI and the second TTI based on the first TTI and the second TTI including consecutive TTIs.

In some examples, to support a third phase coherency capability of the set of multiple phase coherency capabilities, the phase coherence manager 645 may be configured as or otherwise support a means for maintaining phase coherence across uplink messages of the set of multiple uplink messages within the first TTI and the second TTI based on an absence of additional uplink communications scheduled within the gap, an absence of downlink communications scheduled within the gap, or both.

In some examples, to support a fourth phase coherency capability of the set of multiple phase coherency capabilities, the uplink message transmitting manager 635 may be configured as or otherwise support a means for maintaining phase coherence across uplink messages of the set of multiple uplink messages within the first TTI and the second TTI based on a type of additional uplink communications scheduled within the gap, a type of additional downlink communications scheduled within the gap, or both.

In some examples, the base station communicating manager 650 may be configured as or otherwise support a means for transmitting or receiving a message within a third TTI of the time interval, the third TTI positioned between the first TTI and the second TTI in a time domain, where a fifth phase coherency capability of the set of multiple phase coherency capabilities maintaining phase coherence across uplink messages of the set of multiple uplink messages within the first TTI and the second TTI based on a gap between the third TTI and the second TTI satisfying a time threshold.

In some examples, to support a sixth phase coherency capability of the set of multiple phase coherency capabilities, the phase coherence manager 645 may be configured as or otherwise support a means for maintaining phase coherence across uplink messages of the set of multiple uplink messages within the first TTI and the second TTI based on the time interval being less than or equal to a maximum time interval threshold.

In some examples, the capability transmitting manager 625 may be configured as or otherwise support a means for transmitting, to the base station, additional capability signaling indicating one or more modifications to the one or more phase coherency capabilities. In some examples, the downlink message receiving manager 630 may be configured as or otherwise support a means for receiving, from the base station, a second downlink message scheduling a second set of multiple uplink messages from the UE to the base station. In some examples, the uplink message transmitting manager 635 may be configured as or otherwise support a means for transmitting the second set of multiple uplink messages based on the second downlink message and in accordance with at least one of the one or more modified phase coherency capabilities.

Figure 7:
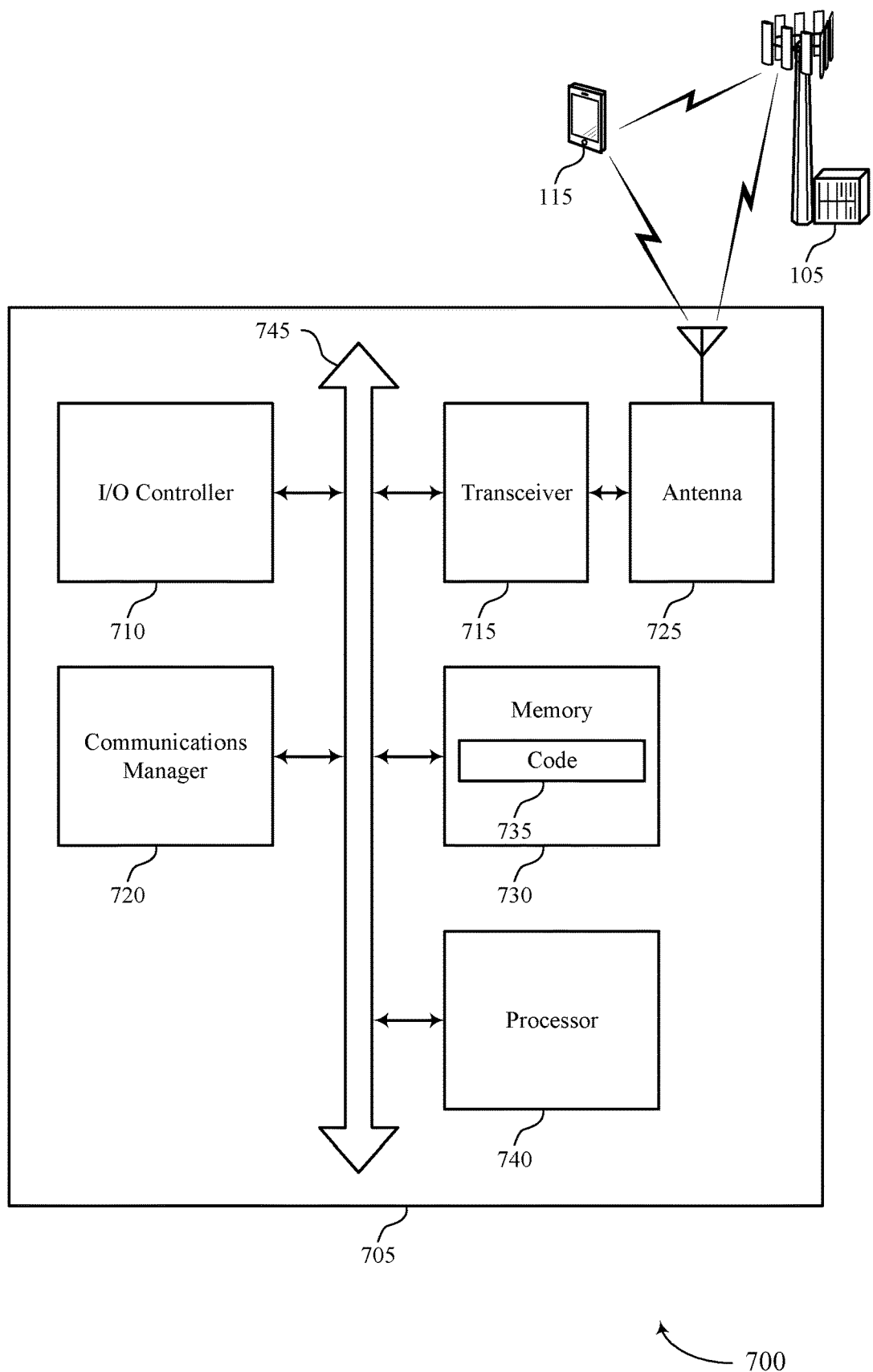
FIG. 7 shows a diagram of a system including a device that supports techniques for reporting uplink transmission continuity capability in accordance with aspects of the present disclosure.

FIG. 7 shows a diagram of a system 700 including a device 705 that supports techniques for reporting uplink transmission continuity capability in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for reporting uplink transmission continuity capability). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The communications manager 720 may be configured as or otherwise support a means for receiving, from the base station, a downlink message scheduling a set of multiple uplink messages from the UE to the base station within the time interval. The communications manager 720 may be configured as or otherwise support a means for transmitting the set of multiple uplink messages within the time interval based on the downlink message and in accordance with at least one of the one or more phase coherency capabilities.

By including or configuring the communications manager 720 in accordance with examples as described herein, the device 705 may support techniques for reporting one or more supported phase coherency capabilities for maintaining phase coherence across multiple uplink messages. Enabling UEs 115 to report supported phase coherency capabilities may improve the ability of the base stations 105 of the wireless communications system to schedule uplink messages at the UEs 115 in accordance with supported phase coherency capabilities at the respective UEs 115. As such, techniques described herein may improve phase coherency of uplink messages transmitted by the UEs 115, which may facilitate channel estimation at the base stations 105, thereby leading to more efficient and reliable wireless communications within the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for reporting uplink transmission continuity capability as described herein, or the processor 740 and the memory 730 may be otherwise configured to perform or support such operations.

Figure 8:
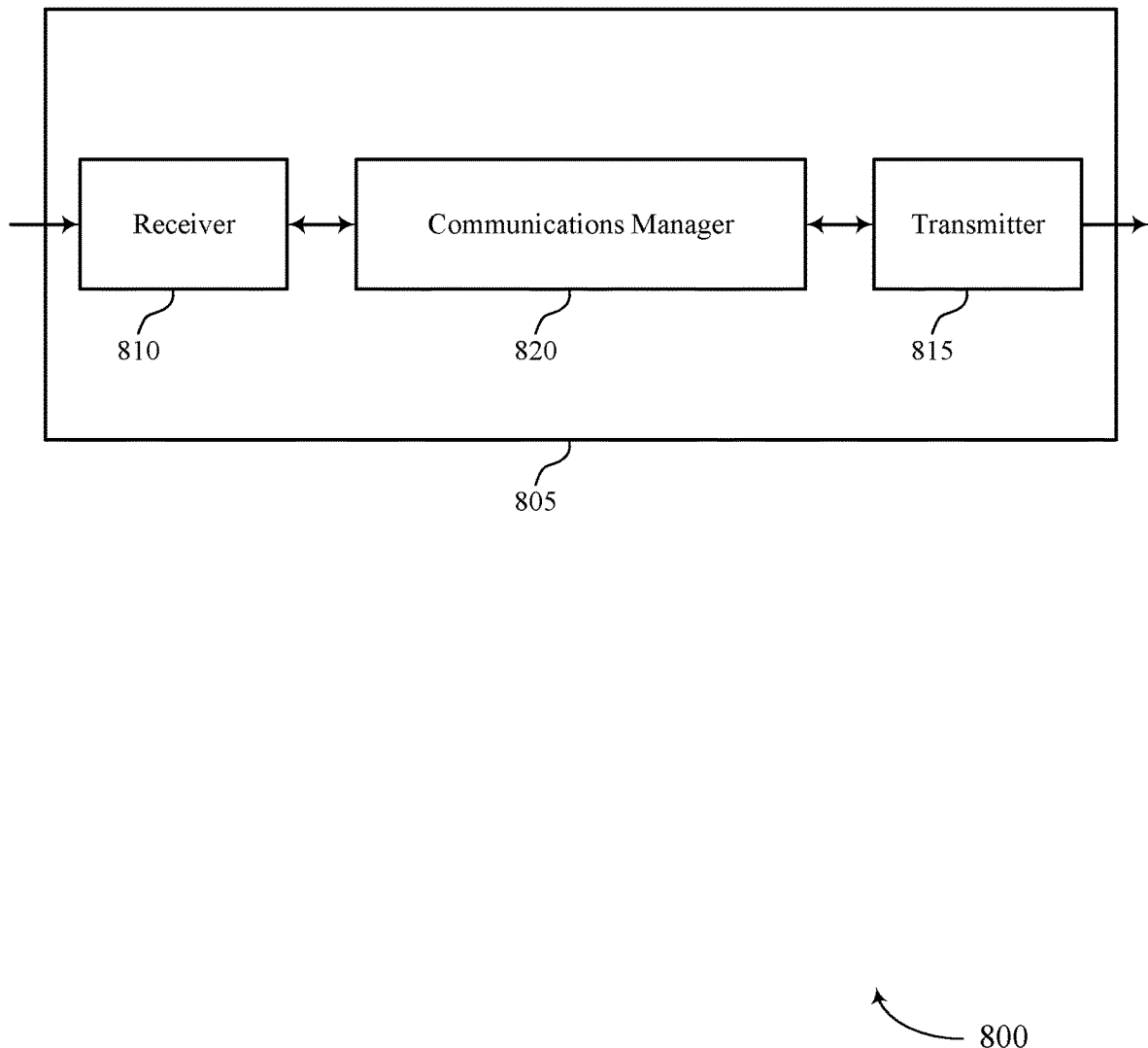
FIGS. 8 and 9 show block diagrams of devices that support techniques for reporting uplink transmission continuity capability in accordance with aspects of the present disclosure.

FIG. 8 shows a block diagram 800 of a device 805 that supports techniques for reporting uplink transmission continuity capability in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reporting uplink transmission continuity capability). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reporting uplink transmission continuity capability). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for reporting uplink transmission continuity capability as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The communications manager 820 may be configured as or otherwise support a means for transmitting, to the UE, a downlink message scheduling a set of multiple uplink messages from the UE to the base station within the time interval. The communications manager 820 may be configured as or otherwise support a means for receiving the set of multiple uplink messages within the time interval based on the downlink message and in accordance with at least one of the one or more phase coherency capabilities.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reporting one or more supported phase coherency capabilities for maintaining phase coherence across multiple uplink messages. Enabling UEs 115 to report supported phase coherency capabilities may improve the ability of the base stations 105 of the wireless communications system to schedule uplink messages at the UEs 115 in accordance with supported phase coherency capabilities at the respective UEs 115. As such, techniques described herein may improve phase coherency of uplink messages transmitted by the UEs 115, which may facilitate channel estimation at the base stations 105, thereby leading to more efficient and reliable wireless communications within the wireless communications system.

Figure 9:
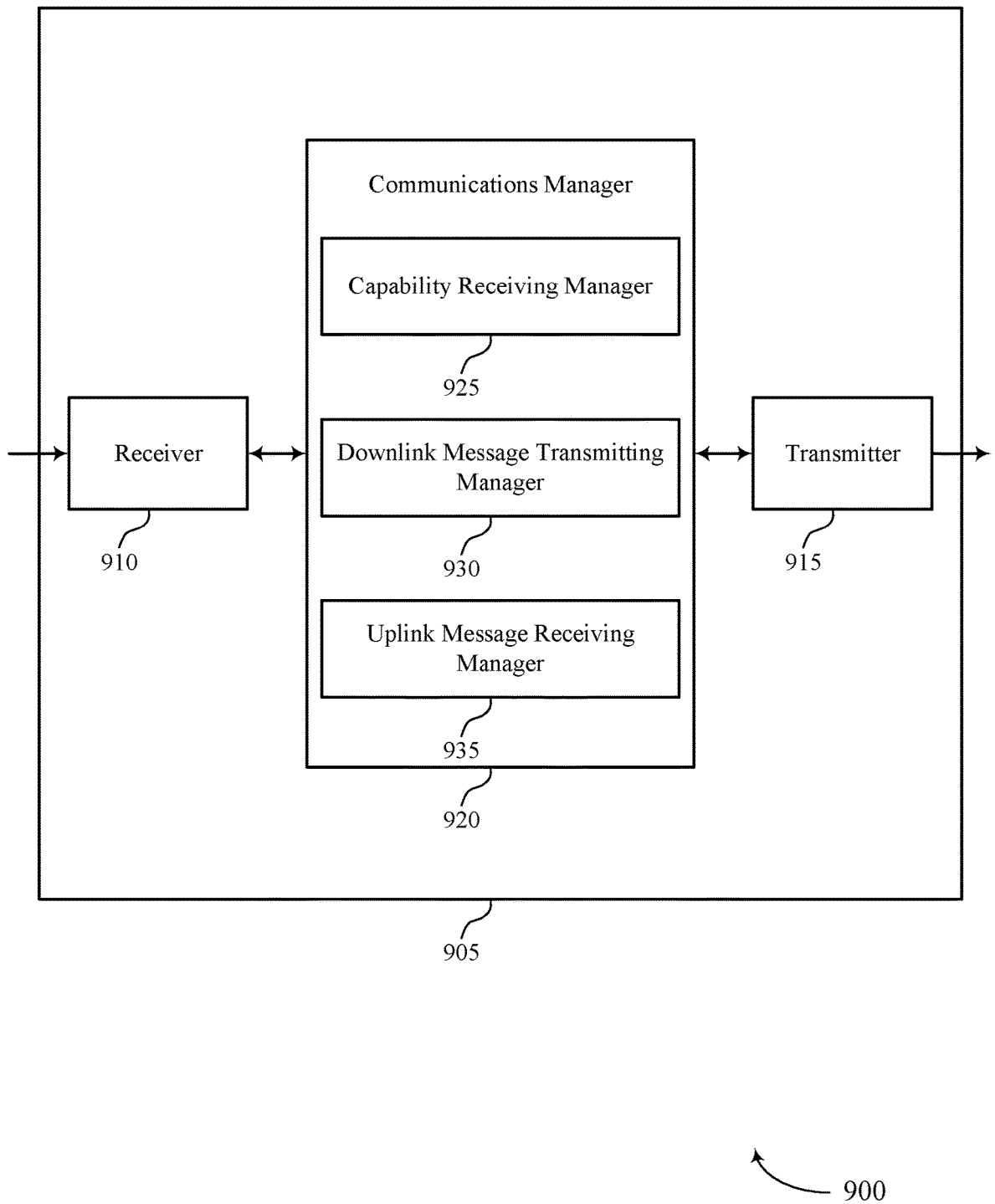

FIG. 9 shows a block diagram 900 of a device 905 that supports techniques for reporting uplink transmission continuity capability in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for reporting uplink transmission continuity capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for reporting uplink transmission continuity capability). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for reporting uplink transmission continuity capability as described herein. For example, the communications manager 920 may include a capability receiving manager 925, a downlink message transmitting manager 930, an uplink message receiving manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The capability receiving manager 925 may be configured as or otherwise support a means for receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The downlink message transmitting manager 930 may be configured as or otherwise support a means for transmitting, to the UE, a downlink message scheduling a set of multiple uplink messages from the UE to the base station within the time interval. The uplink message receiving manager 935 may be configured as or otherwise support a means for receiving the set of multiple uplink messages within the time interval based on the downlink message and in accordance with at least one of the one or more phase coherency capabilities.

Figure 10:
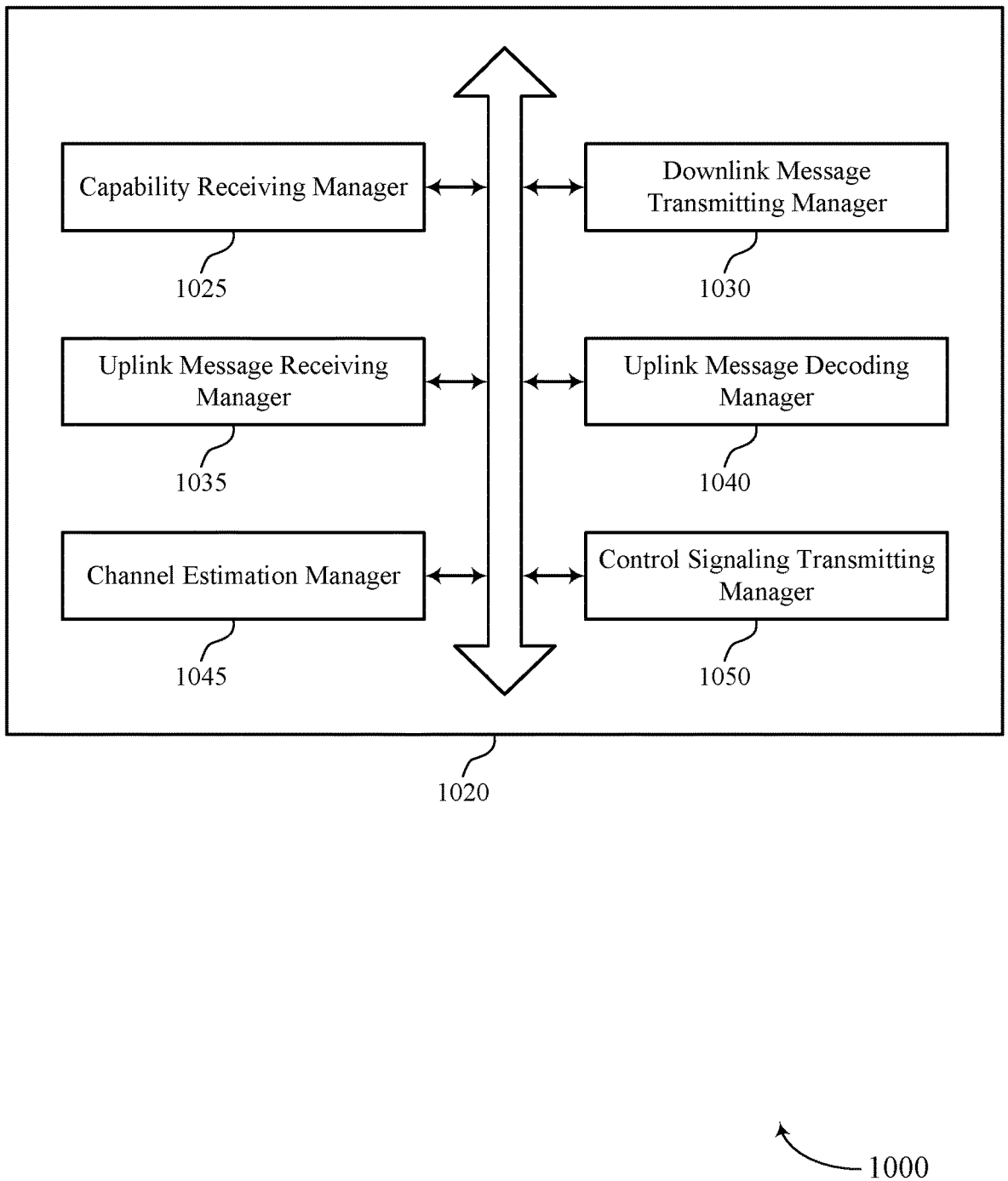
FIG. 10 shows a block diagram of a communications manager that supports techniques for reporting uplink transmission continuity capability in accordance with aspects of the present disclosure.

FIG. 10 shows a block diagram 1000 of a communications manager 1020 that supports techniques for reporting uplink transmission continuity capability in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for reporting uplink transmission continuity capability as described herein. For example, the communications manager 1020 may include a capability receiving manager 1025, a downlink message transmitting manager 1030, an uplink message receiving manager 1035, an uplink message decoding manager 1040, a channel estimation manager 1045, a control signaling transmitting manager 1050, or any combination thereof. Each of these components may communicate, directly or indirectly, with one another (e.g., via one or more buses).

The communications manager 1020 may support wireless communication at a base station in accordance with examples as disclosed herein. The capability receiving manager 1025 may be configured as or otherwise support a means for receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The downlink message transmitting manager 1030 may be configured as or otherwise support a means for transmitting, to the UE, a downlink message scheduling a set of multiple uplink messages from the UE to the base station within the time interval. The uplink message receiving manager 1035 may be configured as or otherwise support a means for receiving the set of multiple uplink messages within the time interval based on the downlink message and in accordance with at least one of the one or more phase coherency capabilities.

In some examples, the uplink message decoding manager 1040 may be configured as or otherwise support a means for decoding the set of multiple uplink messages based on one or more coherency assumptions associated with the set of multiple uplink messages, where the one or more coherency assumptions are determined based on the one or more phase coherency capabilities.

In some examples, the channel estimation manager 1045 may be configured as or otherwise support a means for determining a channel estimate associated with a channel between the UE and the base station based on receiving the set of multiple uplink messages.

In some examples, to support receiving the capability signaling, the capability receiving manager 1025 may be configured as or otherwise support a means for receiving the capability signaling indicating one or more capability index values associated with the one or more phase coherency capabilities.

In some examples, the control signaling transmitting manager 1050 may be configured as or otherwise support a means for transmitting, to the UE, control signaling indicating a set of multiple capability index values associated with a set of multiple phase coherency capabilities, where the set of multiple capability index values include the one or more capability index values, where the set of multiple phase coherency capabilities include the one or more phase coherency capabilities, and where transmitting the one or more capability index values is based on receiving the control signaling. In some examples, the capability signaling indicates one or more parameters of the one or more channel usage characteristics associated with the time interval.

In some examples, the one or more parameters of the one or more channel usage characteristics include a time threshold associated with a gap between consecutive uplink messages of the set of multiple uplink messages, a downlink activity associated with the gap between consecutive uplink messages of the set of multiple uplink messages of the time interval, an uplink activity associated with the gap between consecutive uplink messages of the set of multiple uplink messages of the time interval, a maximum duration of the time interval, a phase coherency threshold, or any combination thereof.

Figure 11:
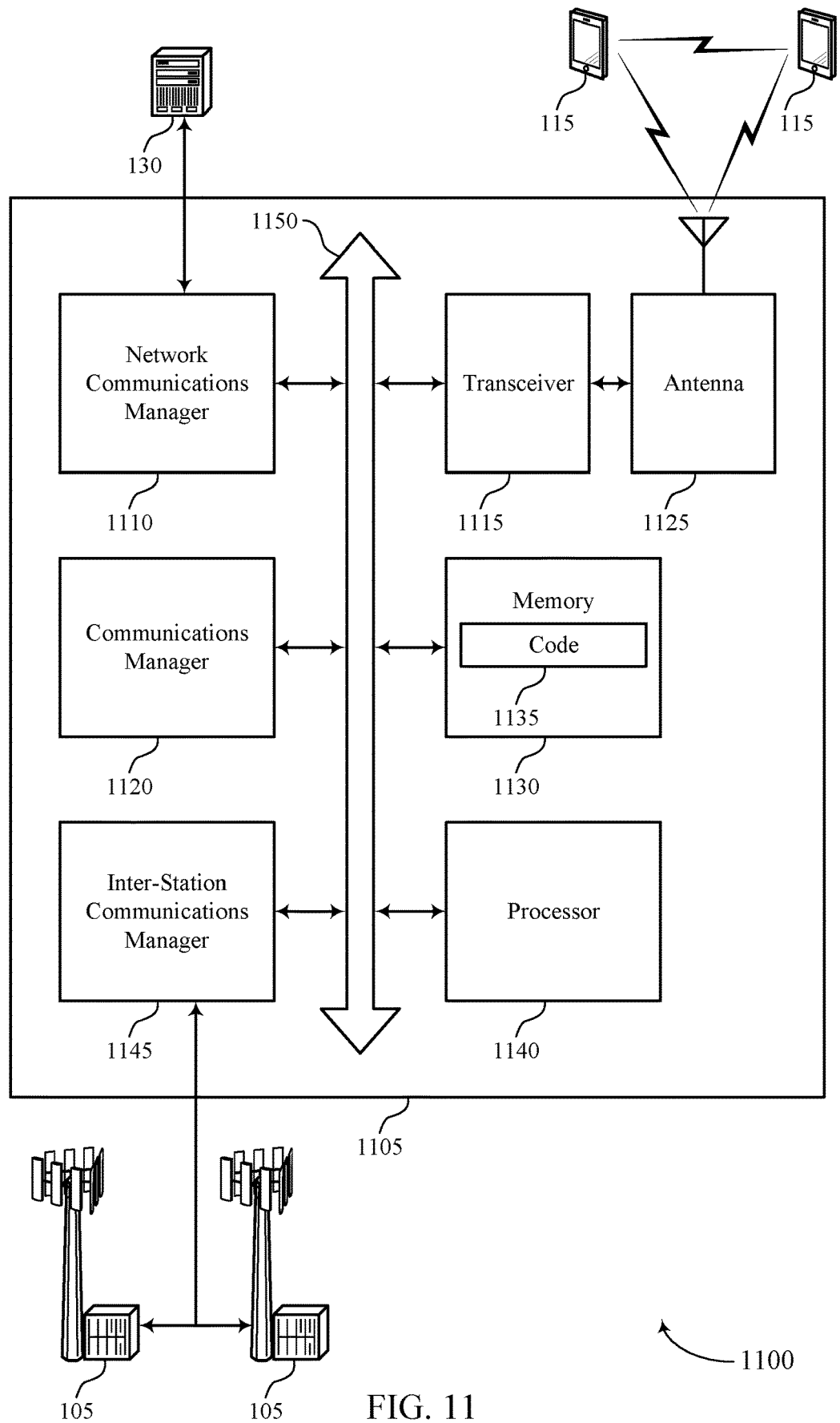
FIG. 11 shows a diagram of a system including a device that supports techniques for reporting uplink transmission continuity capability in accordance with aspects of the present disclosure.

FIG. 11 shows a diagram of a system 1100 including a device 1105 that supports techniques for reporting uplink transmission continuity capability in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for reporting uplink transmission continuity capability). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The communications manager 1120 may be configured as or otherwise support a means for transmitting, to the UE, a downlink message scheduling a set of multiple uplink messages from the UE to the base station within the time interval. The communications manager 1120 may be configured as or otherwise support a means for receiving the set of multiple uplink messages within the time interval based on the downlink message and in accordance with at least one of the one or more phase coherency capabilities.

By including or configuring the communications manager 1120 in accordance with examples as described herein, the device 1105 may support techniques for reporting one or more supported phase coherency capabilities for maintaining phase coherence across multiple uplink messages. Enabling UEs 115 to report supported phase coherency capabilities may improve the ability of the base stations 105 of the wireless communications system to schedule uplink messages at the UEs 115 in accordance with supported phase coherency capabilities at the respective UEs 115. As such, techniques described herein may improve phase coherency of uplink messages transmitted by the UEs 115, which may facilitate channel estimation at the base stations 105, thereby leading to more efficient and reliable wireless communications within the wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for reporting uplink transmission continuity capability as described herein, or the processor 1140 and the memory 1130 may be otherwise configured to perform or support such operations.

Figure 12:
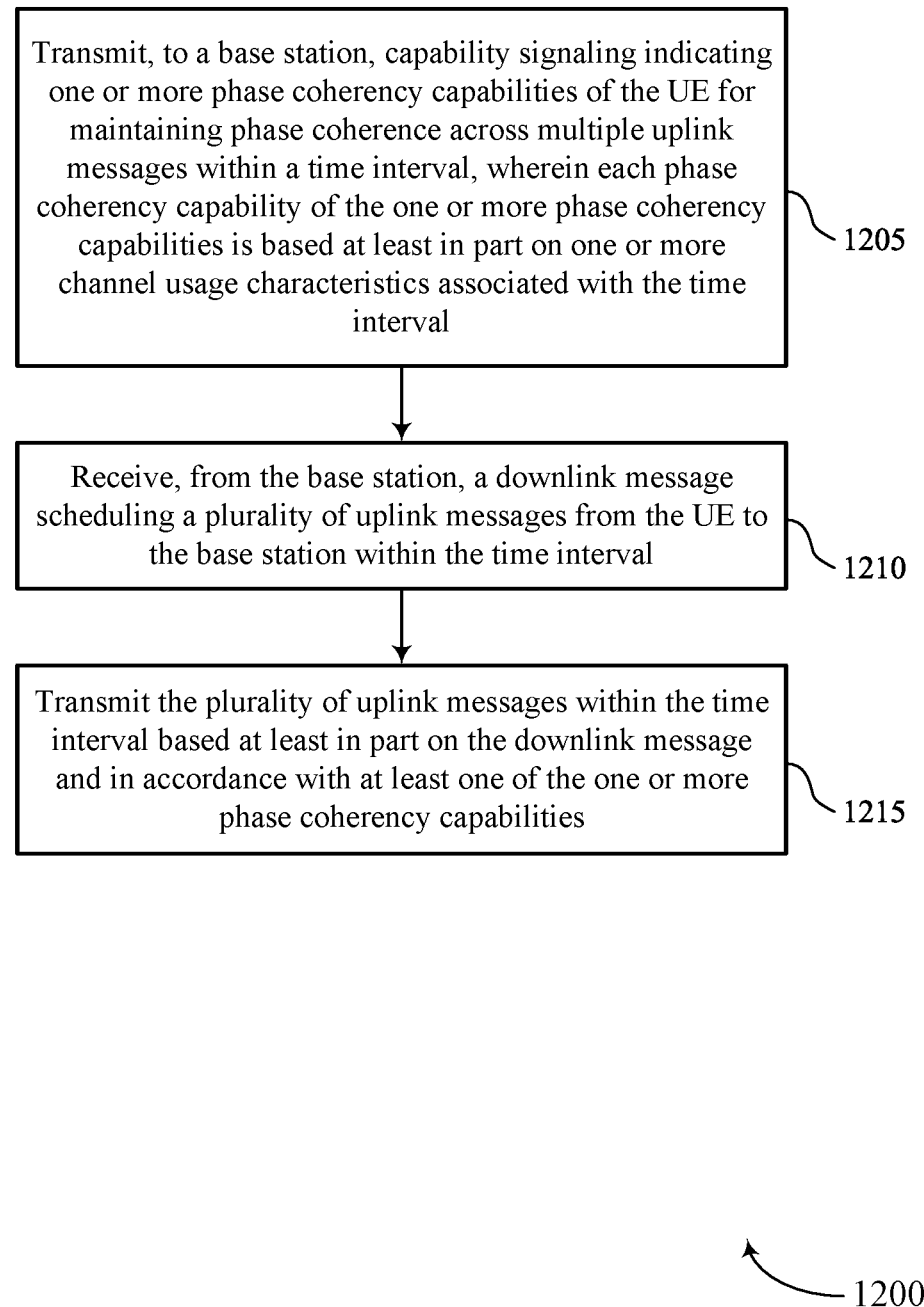
FIGS. 12 through 15 show flowcharts illustrating methods that support techniques for reporting uplink transmission continuity capability in accordance with aspects of the present disclosure.

FIG. 12 shows a flowchart illustrating a method 1200 that supports techniques for reporting uplink transmission continuity capability in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The operations of 1205 may be performed in accordance with examples as disclosed herein. In some examples, aspects of the operations of 1205 may be performed by a capability transmitting manager 625 as described with reference to FIG. 6.

At 1210, the method may include receiving, from the base station, a downlink message scheduling a set of multiple uplink messages from the UE to the base station within the time interval. The operations of 1210 may be performed in accordance with examples as disclosed herein. In some examples, aspects of the operations of 1210 may be performed by a downlink message receiving manager 630 as described with reference to FIG. 6.

At 1215, the method may include transmitting the set of multiple uplink messages within the time interval based on the downlink message and in accordance with at least one of the one or more phase coherency capabilities. The operations of 1215 may be performed in accordance with examples as disclosed herein. In some examples, aspects of the operations of 1215 may be performed by an uplink message transmitting manager 635 as described with reference to FIG. 6.

Figure 13:
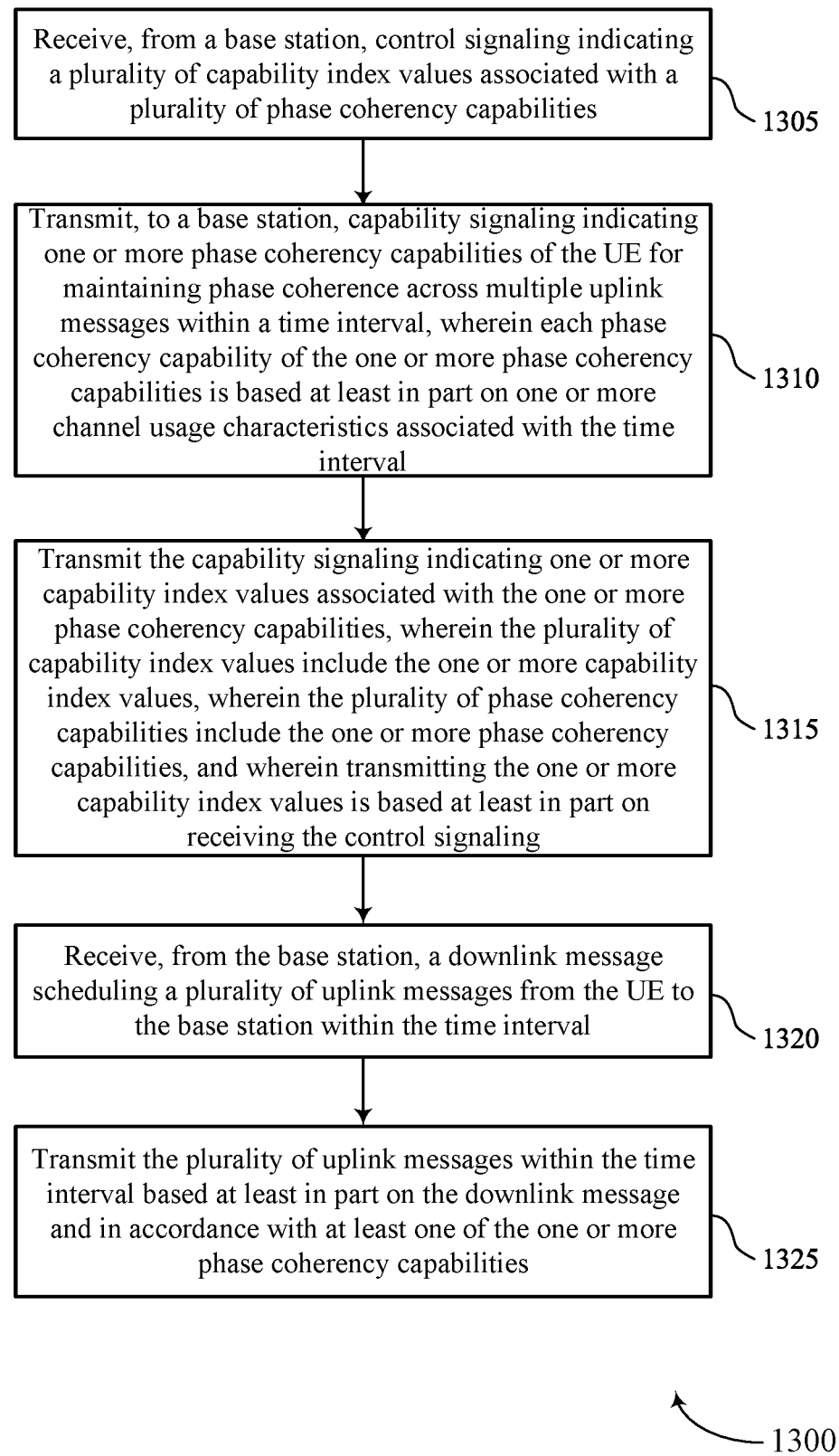

FIG. 13 shows a flowchart illustrating a method 1300 that supports techniques for reporting uplink transmission continuity capability in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a set of multiple capability index values associated with a set of multiple phase coherency capabilities. The operations of 1305 may be performed in accordance with examples as disclosed herein. In some examples, aspects of the operations of 1305 may be performed by a control signaling receiving manager 640 as described with reference to FIG. 6.

At 1310, the method may include transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The operations of 1310 may be performed in accordance with examples as disclosed herein. In some examples, aspects of the operations of 1310 may be performed by a capability transmitting manager 625 as described with reference to FIG. 6.

At 1315, the method may include transmitting the capability signaling indicating one or more capability index values associated with the one or more phase coherency capabilities, where the set of multiple capability index values include the one or more capability index values, where the set of multiple phase coherency capabilities include the one or more phase coherency capabilities, and where transmitting the one or more capability index values is based on receiving the control signaling. The operations of 1315 may be performed in accordance with examples as disclosed herein. In some examples, aspects of the operations of 1315 may be performed by a capability transmitting manager 625 as described with reference to FIG. 6.

At 1320, the method may include receiving, from the base station, a downlink message scheduling a set of multiple uplink messages from the UE to the base station within the time interval. The operations of 1320 may be performed in accordance with examples as disclosed herein. In some examples, aspects of the operations of 1320 may be performed by a downlink message receiving manager 630 as described with reference to FIG. 6.

At 1325, the method may include transmitting the set of multiple uplink messages within the time interval based on the downlink message and in accordance with at least one of the one or more phase coherency capabilities. The operations of 1325 may be performed in accordance with examples as disclosed herein. In some examples, aspects of the operations of 1325 may be performed by an uplink message transmitting manager 635 as described with reference to FIG. 6.

Figure 14:
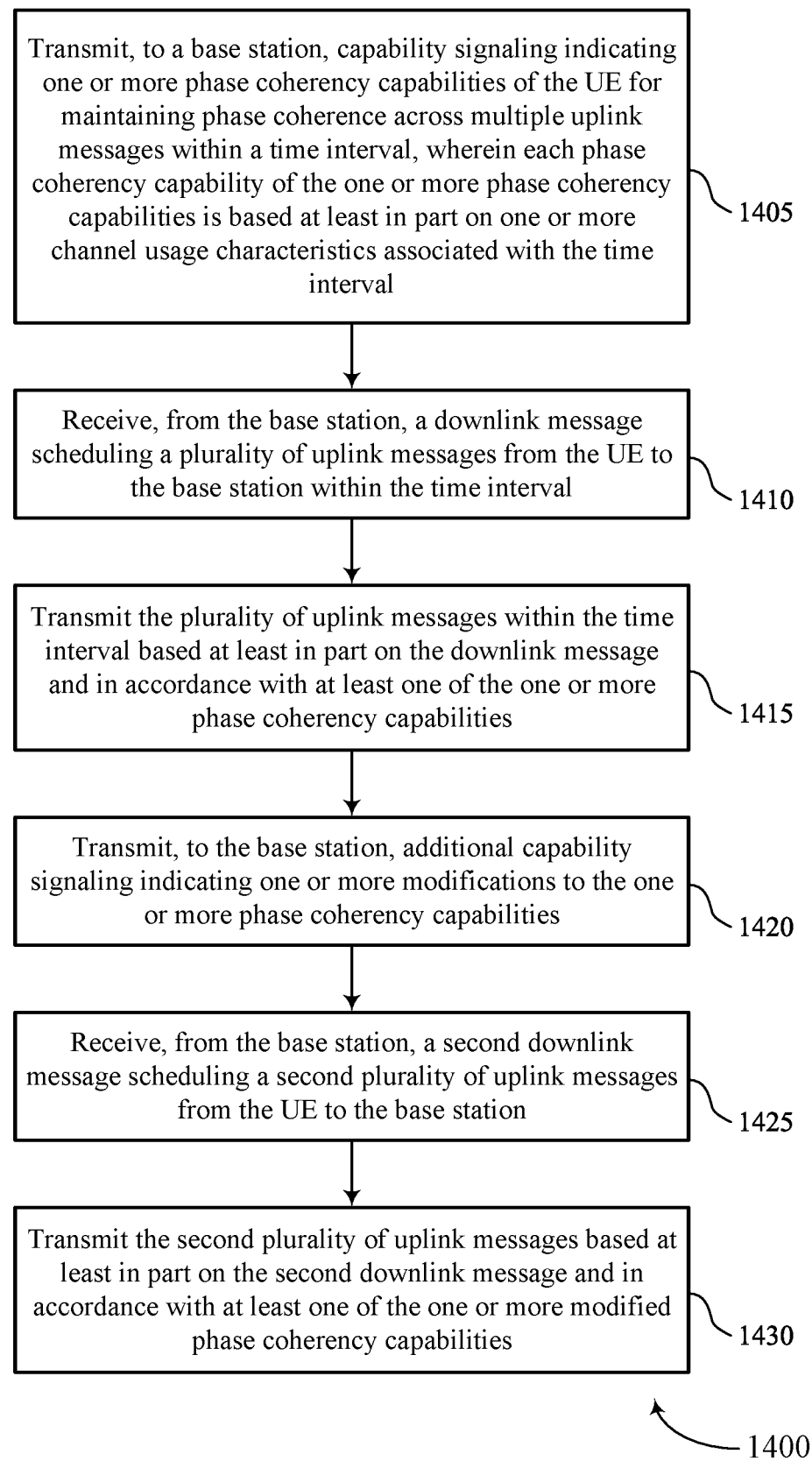

FIG. 14 shows a flowchart illustrating a method 1400 that supports techniques for reporting uplink transmission continuity capability in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The operations of 1405 may be performed in accordance with examples as disclosed herein. In some examples, aspects of the operations of 1405 may be performed by a capability transmitting manager 625 as described with reference to FIG. 6.

At 1410, the method may include receiving, from the base station, a downlink message scheduling a set of multiple uplink messages from the UE to the base station within the time interval. The operations of 1410 may be performed in accordance with examples as disclosed herein. In some examples, aspects of the operations of 1410 may be performed by a downlink message receiving manager 630 as described with reference to FIG. 6.

At 1415, the method may include transmitting the set of multiple uplink messages within the time interval based on the downlink message and in accordance with at least one of the one or more phase coherency capabilities. The operations of 1415 may be performed in accordance with examples as disclosed herein. In some examples, aspects of the operations of 1415 may be performed by an uplink message transmitting manager 635 as described with reference to FIG. 6.

At 1420, the method may include transmitting, to the base station, additional capability signaling indicating one or more modifications to the one or more phase coherency capabilities. The operations of 1420 may be performed in accordance with examples as disclosed herein. In some examples, aspects of the operations of 1420 may be performed by a capability transmitting manager 625 as described with reference to FIG. 6.

At 1425, the method may include receiving, from the base station, a second downlink message scheduling a second set of multiple uplink messages from the UE to the base station. The operations of 1425 may be performed in accordance with examples as disclosed herein. In some examples, aspects of the operations of 1425 may be performed by a downlink message receiving manager 630 as described with reference to FIG. 6.

At 1430, the method may include transmitting the second set of multiple uplink messages based on the second downlink message and in accordance with at least one of the one or more modified phase coherency capabilities. The operations of 1430 may be performed in accordance with examples as disclosed herein. In some examples, aspects of the operations of 1430 may be performed by an uplink message transmitting manager 635 as described with reference to FIG. 6.

Figure 15:
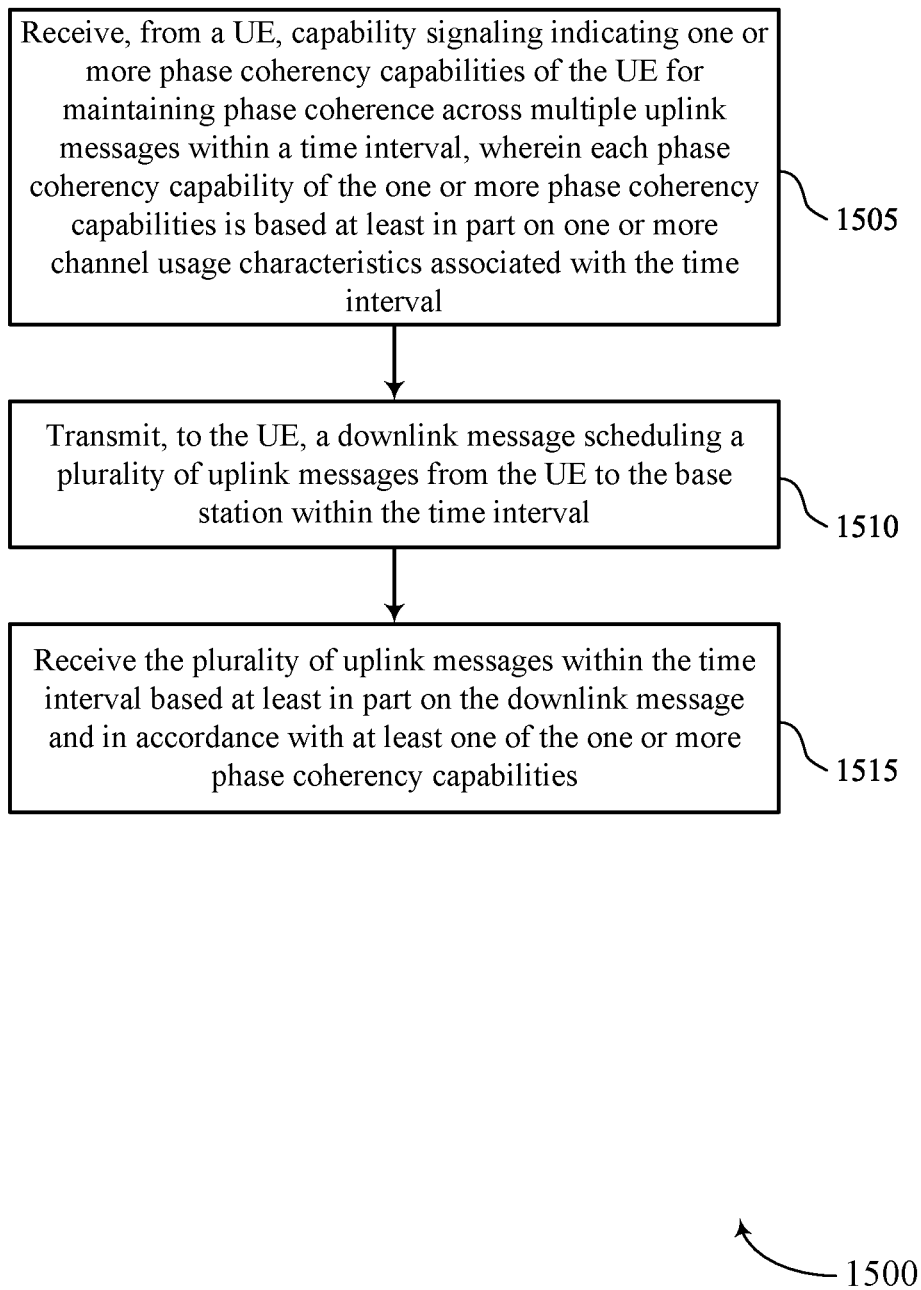

FIG. 15 shows a flowchart illustrating a method 1500 that supports techniques for reporting uplink transmission continuity capability in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, capability signaling indicating one or more phase coherency capabilities of the UE for maintaining phase coherence across multiple uplink messages within a time interval, where each phase coherency capability of the one or more phase coherency capabilities is based on one or more channel usage characteristics associated with the time interval. The operations of 1505 may be performed in accordance with examples as disclosed herein. In some examples, aspects of the operations of 1505 may be performed by a capability receiving manager 1025 as described with reference to FIG. 10.

At 1510, the method may include transmitting, to the UE, a downlink message scheduling a set of multiple uplink messages from the UE to the base station within the time interval. The operations of 1510 may be performed in accordance with examples as disclosed herein. In some examples, aspects of the operations of 1510 may be performed by a downlink message transmitting manager 1030 as described with reference to FIG. 10.

At 1515, the method may include receiving the set of multiple uplink messages within the time interval based on the downlink message and in accordance with at least one of the one or more phase coherency capabilities. The operations of 1515 may be performed in accordance with examples as disclosed herein. In some examples, aspects of the operations of 1515 may be performed by an uplink message receiving manager 1035 as described with reference to FIG. 10.

The following provides an overview of aspects of the present disclosure:

Aspect 1: A method for wireless communication at a UE, comprising: transmitting, to a base station, capability signaling indicating one or more phase coherency capabilities of the UE for maintaining phase coherence across multiple uplink messages within a time interval, wherein each phase coherency capability of the one or more phase coherency capabilities is based at least in part on one or more channel usage characteristics associated with the time interval; receiving, from the base station, a downlink message scheduling a plurality of uplink messages from the UE to the base station within the time interval; and transmitting the plurality of uplink messages within the time interval based at least in part on the downlink message and in accordance with at least one of the one or more phase coherency capabilities.

Aspect 2: The method of aspect 1, wherein transmitting the capability signaling comprises: transmitting the capability signaling indicating one or more capability index values associated with the one or more phase coherency capabilities.

Aspect 3: The method of aspect 2, further comprising: receiving, from the base station, control signaling indicating a plurality of capability index values associated with a plurality of phase coherency capabilities, wherein the plurality of capability index values include the one or more capability index values, wherein the plurality of phase coherency capabilities include the one or more phase coherency capabilities, and wherein transmitting the one or more capability index values is based at least in part on receiving the control signaling.

Aspect 4: The method of any of aspects 1 through 3, wherein the capability signaling indicates one or more parameters of the one or more channel usage characteristics associated with the time interval.

Aspect 5: The method of aspect 4, wherein the one or more parameters of the one or more channel usage characteristics comprise a time threshold associated with a gap between consecutive uplink messages of the plurality of uplink messages, a downlink activity associated with the gap between consecutive uplink messages of the plurality of uplink messages of the time interval, an uplink activity associated with the gap between consecutive uplink messages of the plurality of uplink messages of the time interval, a maximum duration of the time interval, a phase coherency threshold, or any combination thereof.

Aspect 6: The method of any of aspects 1 through 5, wherein the time interval comprises a first TTI and a second TTI, and phase coherence is maintained across uplink messages of the plurality of uplink messages if a phase difference between phases of the respective uplink messages is less than or equal to a phase threshold.

Aspect 7: The method of aspect 6, wherein a first phase coherency capability of the plurality of phase coherency capabilities comprises: maintaining phase coherence across uplink messages of the plurality of uplink messages within the first TTI and the second TTI based at least in part on a gap between the first TTI and the second TTI satisfying a time threshold.

Aspect 8: The method of aspect 7, wherein the gap satisfies the time threshold if the gap is less than or equal to the time threshold.

Aspect 9: The method of any of aspects 6 through 8, wherein a second phase coherency capability of the plurality of phase coherency capabilities comprises: maintaining phase coherence across uplink messages of the plurality of uplink messages within the first TTI and the second TTI based at least in part on the first TTI and the second TTI comprising consecutive TTIs.

Aspect 10: The method of any of aspects 6 through 9, wherein the first TTI and the second TTI are separated in a time domain by a gap, wherein a third phase coherency capability of the plurality of phase coherency capabilities comprises: maintaining phase coherence across uplink messages of the plurality of uplink messages within the first TTI and the second TTI based at least in part on an absence of additional uplink communications scheduled within the gap, an absence of downlink communications scheduled within the gap, or both.

Aspect 11: The method of any of aspects 6 through 10, wherein the first TTI and the second TTI are separated in a time domain by a gap, wherein a fourth phase coherency capability of the plurality of phase coherency capabilities comprises: maintaining phase coherence across uplink messages of the plurality of uplink messages within the first TTI and the second TTI based at least in part on a type of additional uplink communications scheduled within the gap, a type of additional downlink communications scheduled within the gap, or both.

Aspect 12: The method of any of aspects 6 through 11, further comprising: transmitting or receiving a message within a third TTI of the time interval, the third TTI positioned between the first TTI and the second TTI in a time domain, wherein a fifth phase coherency capability of the plurality of phase coherency capabilities maintaining phase coherence across uplink messages of the plurality of uplink messages within the first TTI and the second TTI based at least in part on a gap between the third TTI and the second TTI satisfying a time threshold.

Aspect 13: The method of any of aspects 6 through 12, wherein a sixth phase coherency capability of the plurality of phase coherency capabilities comprises: maintaining phase coherence across uplink messages of the plurality of uplink messages within the first TTI and the second TTI based at least in part on the time interval being less than or equal to a maximum time interval threshold.

Aspect 14: The method of any of aspects 1 through 13, further comprising: transmitting, to the base station, additional capability signaling indicating one or more modifications to the one or more phase coherency capabilities; receiving, from the base station, a second downlink message scheduling a second plurality of uplink messages from the UE to the base station; and transmitting the second plurality of uplink messages based at least in part on the second downlink message and in accordance with at least one of the one or more modified phase coherency capabilities.

Aspect 15: A method for wireless communication at a base station, comprising: receiving, from a UE, capability signaling indicating one or more phase coherency capabilities of the UE for maintaining phase coherence across multiple uplink messages within a time interval, wherein each phase coherency capability of the one or more phase coherency capabilities is based at least in part on one or more channel usage characteristics associated with the time interval; transmitting, to the UE, a downlink message scheduling a plurality of uplink messages from the UE to the base station within the time interval; and receiving the plurality of uplink messages within the time interval based at least in part on the downlink message and in accordance with at least one of the one or more phase coherency capabilities.

Aspect 16: The method of aspect 15, further comprising: decoding the plurality of uplink messages based at least in part on one or more coherency assumptions associated with the plurality of uplink messages, wherein the one or more coherency assumptions are determined based at least in part on the one or more phase coherency capabilities.

Aspect 17: The method of any of aspects 15 through 16, further comprising: determining a channel estimate associated with a channel between the UE and the base station based at least in part on receiving the plurality of uplink messages.

Aspect 18: The method of any of aspects 15 through 17, wherein receiving the capability signaling comprises: receiving the capability signaling indicating one or more capability index values associated with the one or more phase coherency capabilities.

Aspect 19: The method of aspect 18, further comprising: transmitting, to the UE, control signaling indicating a plurality of capability index values associated with a plurality of phase coherency capabilities, wherein the plurality of capability index values include the one or more capability index values, wherein the plurality of phase coherency capabilities include the one or more phase coherency capabilities, and wherein transmitting the one or more capability index values is based at least in part on receiving the control signaling.

Aspect 20: The method of any of aspects 15 through 19, wherein the capability signaling indicates one or more parameters of the one or more channel usage characteristics associated with the time interval.

Aspect 21: The method of aspect 20, wherein the one or more parameters of the one or more channel usage characteristics comprise a time threshold associated with a gap between consecutive uplink messages of the plurality of uplink messages, a downlink activity associated with the gap between consecutive uplink messages of the plurality of uplink messages of the time interval, an uplink activity associated with the gap between consecutive uplink messages of the plurality of uplink messages of the time interval, a maximum duration of the time interval, a phase coherency threshold, or any combination thereof.

Aspect 22: An apparatus for wireless communication at a UE, comprising a processor; memory coupled with the processor; and instructions stored in the memory and executable by the processor to cause the apparatus to perform a method of any of aspects 1 through 14.

Aspect 23: An apparatus for wireless communication at a UE, comprising at least one means for performing a method of any of aspects 1 through 14.

Aspect 24: A non-transitory computer-readable medium storing code for wireless communication at a UE, the code comprising instructions executable by a processor to perform a method of any of aspects 1 through 14.

Aspect 25: An apparatus for wireless communication at a base station, comprising a processor; memory coupled with the processor; and instructions stored in the memory and executable by the processor to cause the apparatus to perform a method of any of aspects 15 through 21.

Aspect 26: An apparatus for wireless communication at a base station, comprising at least one means for performing a method of any of aspects 15 through 21.

Aspect 27: A non-transitory computer-readable medium storing code for wireless communication at a base station, the code comprising instructions executable by a processor to perform a method of any of aspects 15 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  transmitting, to a network entity, capability signaling indicating a capability of the UE to maintain phase coherence across multiple uplink messages within a first transmission time interval and a second transmission time interval based at least in part on an absence of additional uplink communications, an absence of additional downlink communications, or both, scheduled within a gap between the first transmission time interval and the second transmission time interval;
  receiving, from the network entity, a downlink message scheduling a plurality of uplink messages from the UE to the network entity within the first transmission time interval and the second transmission time interval; and
  transmitting the plurality of uplink messages within the first transmission time interval and the second transmission time interval based at least in part on the downlink message, wherein phase coherence is maintained across the plurality of uplink messages in accordance with the capability.

2. The method of claim 1, wherein transmitting the capability signaling comprises:
  transmitting the capability signaling indicating a capability index value associated with the capability.

3. The method of claim 2, further comprising:
  receiving, from the network entity, control signaling indicating a plurality of capability index values associated with a plurality of capabilities for maintaining phase coherence, wherein the plurality of capability index values include the capability index value, wherein the plurality of capabilities include the capability, and wherein transmitting the capability index value is based at least in part on receiving the control signaling.

4. The method of claim 1, wherein the capability signaling indicates one or more parameters of one or more channel usage characteristics associated with a time interval including the first transmission time interval and the second transmission time interval, wherein the capability is based at least in part on the one or more channel usage characteristics.

5. The method of claim 4, wherein the one or more parameters of the one or more channel usage characteristics comprise a time threshold associated with the gap, a downlink activity associated with the gap, an uplink activity associated with the gap, a maximum duration of the time interval, a phase coherency threshold, or any combination thereof.

6. The method of claim 1, wherein phase coherence is maintained across uplink messages of the plurality of uplink messages if a phase difference between phases of the respective uplink messages is less than or equal to a phase threshold.

7. The method of claim 1, further comprising:
  transmitting, via the capability signaling, an indication of a second capability of the UE to maintain phase coherence across uplink messages of the plurality of uplink messages within the first transmission time interval and the second transmission time interval based at least in part on the gap between the first transmission time interval and the second transmission time interval satisfying a time threshold.

8. The method of claim 7, wherein the gap satisfies the time threshold if the gap is less than or equal to the time threshold.

9. The method of claim 1, further comprising:
  transmitting, via the capability signaling, an indication of a second capability of the UE to maintain phase coherence across uplink messages of the plurality of uplink messages within the first transmission time interval and the second transmission time interval based at least in part on the first transmission time interval and the second transmission time interval comprising consecutive transmission time intervals.

10. The method of claim 1, wherein the first transmission time interval and the second transmission time interval are separated in a time domain by the gap.

11. The method of claim 1, further comprising:
  transmitting, via the capability signaling, an indication of a second capability of the UE to maintain phase coherence across uplink messages of the plurality of uplink messages within the first transmission time interval and the second transmission time interval based at least in part on a type of additional uplink communications scheduled within the gap, a type of additional downlink communications scheduled within the gap, or both.

12. The method of claim 1, further comprising:
transmitting, via the capability signaling, an indication of a second capability of the UE to maintain phase coherence across uplink messages of the plurality of uplink messages within the first transmission time interval and the second transmission time interval based at least in part on a second gap between a third transmission time interval and the second transmission time interval satisfying a time threshold, wherein the third transmission time interval is positioned between the first transmission time interval and the second transmission time interval in a time domain.

13. The method of claim 1, further comprising:
transmitting, via the capability signaling, an indication of a second capability of the UE to maintain phase coherence across uplink messages of the plurality of uplink messages within the first transmission time interval and the second transmission time interval based at least in part on time interval including the first transmission time interval and the second transmission time interval being less than or equal to a maximum time interval threshold.

14. The method of claim 1, further comprising:
transmitting, to the network entity, additional capability signaling indicating one or more modifications to the capability;
receiving, from the network entity, a second downlink message scheduling a second plurality of uplink messages from the UE to the network entity; and
transmitting the second plurality of uplink messages based at least in part on the second downlink message and in accordance with the one or more modifications to the capability.

15. A method for wireless communication at a network entity, comprising:
receiving, from a user equipment (UE), capability signaling indicating a capability of the UE to maintain phase coherence across multiple uplink messages within a first transmission time interval and a second transmission time interval based at least in part on an absence of additional uplink communications, an absence of additional downlink communications, or both, scheduled within a gap between the first transmission time interval and the second transmission time interval;
transmitting, to the UE, a downlink message scheduling a plurality of uplink messages from the UE to the network entity within the first transmission time interval and the second transmission time interval; and
receiving the plurality of uplink messages within the first transmission time interval and the second transmission time interval based at least in part on the downlink message, wherein phase coherence is maintained across the plurality of uplink messages in accordance with the capability.

16. The method of claim 15, further comprising:
decoding the plurality of uplink messages based at least in part on one or more coherency assumptions associated with the plurality of uplink messages, wherein the one or more coherency assumptions are determined based at least in part on the capability.

17. The method of claim 15, further comprising:
determining a channel estimate associated with a channel between the UE and the network entity based at least in part on receiving the plurality of uplink messages.

18. The method of claim 15, wherein receiving the capability signaling comprises:
receiving the capability signaling indicating a capability index value associated with the capability.

19. The method of claim 18, further comprising:
transmitting, to the UE, control signaling indicating a plurality of capability index values associated with a plurality of capabilities for maintaining phase coherence, wherein the plurality of capability index values include the capability index value, wherein the plurality of capabilities include the capability, and wherein transmitting the one or more capability index values is based at least in part on receiving the control signaling.

20. The method of claim 15, wherein the capability signaling indicates one or more parameters of one or more channel usage characteristics associated with a time interval including the first transmission time interval and the second transmission time interval, wherein the capability is based at least in part on the one or more channel usage characteristics.

21. The method of claim 20, wherein the one or more parameters of the one or more channel usage characteristics comprise a time threshold associated with the gap, a downlink activity associated with the gap, an uplink activity associated with the gap, a maximum duration of the time interval, a phase coherency threshold, or any combination thereof.

22. An apparatus for wireless communication at a user equipment (UE), comprising:
a processor;
memory coupled with the processor; and
instructions stored in the memory and executable by the processor to cause the apparatus to:
transmit, to a network entity, capability signaling indicating a capability of the UE to maintain phase coherence across multiple uplink messages within a first transmission time interval and a second transmission time interval based at least in part on an absence of additional uplink communications, an absence of additional downlink communications, or both, scheduled within a gap between the first transmission time interval and the second transmission time interval;
receive, from the network entity, a downlink message scheduling a plurality of uplink messages from the UE to the network entity within the first transmission time interval and the second transmission time interval; and
transmit the plurality of uplink messages within the first transmission time interval and the second transmission time interval based at least in part on the downlink message, wherein phase coherence is maintained across the plurality of uplink messages in accordance with the capability.

23. The apparatus of claim 22, wherein the instructions to transmit the capability signaling are executable by the processor to cause the apparatus to:
transmit the capability signaling indicating a capability index value associated with the capability.

24. The apparatus of claim 23, wherein the instructions are further executable by the processor to cause the apparatus to:
receive, from the network entity, control signaling indicating a plurality of capability index values associated with a plurality of capabilities for maintaining phase coherence, wherein the plurality of capability index values include the capability index value, wherein the plurality of capabilities include the capability, and wherein transmitting the capability index value is based at least in part on receiving the control signaling.

25. The apparatus of claim 22, wherein the capability signaling indicates one or more parameters of one or more channel usage characteristics associated with a time interval including the first transmission time interval and the second transmission time interval, wherein the capability is based at least in part on the one or more channel usage characteristics.

26. The apparatus of claim 25, wherein the one or more parameters of the one or more channel usage characteristics comprise a time threshold associated with the gap, a downlink activity associated with the gap, an uplink activity associated with the gap, a maximum duration of the time interval, a phase coherency threshold, or any combination thereof.

27. An apparatus for wireless communication at a network entity, comprising:
  a processor;
  memory coupled with the processor; and
  instructions stored in the memory and executable by the processor to cause the apparatus to:
    receive, from a user equipment (UE), capability signaling indicating a capability of the UE to maintain phase coherence across multiple uplink messages within a first transmission time interval and a second transmission time interval based at least in part on an absence of additional uplink communications, an absence of additional downlink communications, or both, scheduled within a gap between the first transmission time interval and the second transmission time interval;
    transmit, to the UE, a downlink message scheduling a plurality of uplink messages from the UE to the network entity within the first transmission time interval and the second transmission time interval; and
    receive the plurality of uplink messages within the first transmission time interval and the second transmission time interval based at least in part on the downlink message, wherein phase coherence is maintained across the plurality of uplink messages in accordance with the capability.

28. The apparatus of claim 27, wherein the instructions are further executable by the processor to cause the apparatus to:
  decode the plurality of uplink messages based at least in part on one or more coherency assumptions associated with the plurality of uplink messages, wherein the one or more coherency assumptions are determined based at least in part on the capability.

29. The apparatus of claim 27, wherein the instructions are further executable by the processor to cause the apparatus to:
  determine a channel estimate associated with a channel between the UE and the network entity based at least in part on receiving the plurality of uplink messages.

30. The apparatus of claim 27, wherein the instructions to receive the capability signaling are executable by the processor to cause the apparatus to:
  receive the capability signaling indicating a capability index value associated with the capability.

* * * * *